United States Patent
Blankespoor et al.

(10) Patent No.: US 10,434,651 B1
(45) Date of Patent: *Oct. 8, 2019

(54) FAILURE MODE

(71) Applicant: Boston Dynamics, Inc., Waltham, MA (US)

(72) Inventors: Kevin Blankespoor, Arlington, MA (US); Alexander Douglas Perkins, Arlington, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/870,887

(22) Filed: Jan. 13, 2018

Related U.S. Application Data

(63) Continuation of application No. 14/482,415, filed on Sep. 10, 2014, now Pat. No. 9,895,804.

(60) Provisional application No. 62/042,136, filed on Aug. 26, 2014.

(51) Int. Cl.
| | |
|---|---|
| *G06F 19/00* | (2018.01) |
| *B25J 9/16* | (2006.01) |
| *B25J 17/00* | (2006.01) |
| *B25J 9/14* | (2006.01) |
| *B62D 57/032* | (2006.01) |

(52) U.S. Cl.
CPC ............. *B25J 9/1674* (2013.01); *B25J 9/14* (2013.01); *B25J 9/1664* (2013.01); *B25J 9/1694* (2013.01); *B25J 17/00* (2013.01); *B62D 57/032* (2013.01); *Y10S 901/01* (2013.01)

(58) Field of Classification Search
CPC . B25J 9/1674; B25J 9/14; B25J 9/1664; B25J 9/1694; B25J 17/00; B62D 57/032; Y10S 901/01
USPC .................................................. 700/245, 258
See application file for complete search history.

(56) References Cited

U.S. PATENT DOCUMENTS

| | | | |
|---|---|---|---|
| 5,159,988 A | 11/1992 | Gomi et al. | |
| 5,355,064 A * | 10/1994 | Yoshino | B62D 57/032 180/8.1 |
| 5,432,417 A | 7/1995 | Takenaka et al. | |
| 5,513,106 A | 4/1996 | Yoshino et al. | |
| 6,064,167 A * | 5/2000 | Takenaka | B25J 19/005 318/568.12 |
| 7,295,892 B2 * | 11/2007 | Herr | B62D 57/032 700/245 |
| 8,369,991 B2 * | 2/2013 | Goswami | B62D 57/032 700/245 |
| 8,554,370 B2 | 10/2013 | Goswami et al. | |

(Continued)

*Primary Examiner* — Ronnie M Mancho
(74) *Attorney, Agent, or Firm* — Honigman LLP

(57) ABSTRACT

A control system of a robotic device may receive sensor data indicating at least one deviation from a nominal operating parameter of the robotic device, where the robotic device includes articulable legs that include respective actuators, and where one or more strokes of the actuators cause the articulable legs to articulate. Based on the received sensor data, the control system may determine that the at least one deviation exceeds a pre-determined threshold. In response to determining that the at least one deviation exceeds the pre-determined threshold, the control system may provide instructions for centering the one or more strokes at approximately a mid-point of extension of the actuators, and reducing a stroke length of the one or more strokes of the actuators.

23 Claims, 17 Drawing Sheets

(56) References Cited

U.S. PATENT DOCUMENTS

| | | | |
|---|---|---|---|
| 9,089,968 B2 * | 7/2015 | Goulding | B62D 57/024 |
| 9,387,588 B1 * | 7/2016 | Blankespoor | B62D 57/032 |
| 9,387,896 B1 * | 7/2016 | Blankespoor | B62D 57/032 |
| 9,488,987 B2 | 11/2016 | Goulding | |
| 9,594,377 B1 * | 3/2017 | Perkins | G05D 1/021 |
| 9,849,926 B2 * | 12/2017 | Saunders | G05D 16/2006 |
| 2003/0009259 A1 * | 1/2003 | Hattori | B25J 13/085 |
| | | | 700/245 |
| 2003/0023347 A1 | 1/2003 | Konno et al. | |
| 2003/0144763 A1 * | 7/2003 | Mori | B62D 57/032 |
| | | | 700/245 |
| 2003/0152261 A1 | 8/2003 | Hiroe et al. | |
| 2004/0103740 A1 | 6/2004 | Townsend et al. | |
| 2004/0133308 A1 * | 7/2004 | Kato | G06N 3/008 |
| | | | 700/245 |
| 2005/0102246 A1 * | 5/2005 | Movellan | G06K 9/00248 |
| | | | 706/12 |
| 2005/0107916 A1 * | 5/2005 | Nagasaka | B62D 57/02 |
| | | | 700/245 |
| 2005/0125099 A1 * | 6/2005 | Mikami | G06N 3/008 |
| | | | 700/245 |
| 2006/0033462 A1 * | 2/2006 | Moridaira | B25J 9/1674 |
| | | | 318/568.12 |
| 2007/0013506 A1 * | 1/2007 | Takenaka | B25J 13/085 |
| | | | 340/500 |
| 2008/0109115 A1 * | 5/2008 | Lim | B62D 57/032 |
| | | | 700/258 |
| 2011/0231050 A1 * | 9/2011 | Goulding | B62D 57/024 |
| | | | 701/26 |
| 2012/0072026 A1 | 3/2012 | Takagi | |
| 2012/0245735 A1 | 9/2012 | Lee et al. | |
| 2013/0013111 A1 * | 1/2013 | Hurst | B62D 57/032 |
| | | | 700/258 |
| 2016/0023699 A1 * | 1/2016 | Saunders | G05D 16/2006 |
| | | | 180/8.6 |
| 2016/0107309 A1 | 4/2016 | Walsh et al. | |

* cited by examiner

FAILURE MODE

CROSS REFERENCE TO RELATED APPLICATIONS

This U.S. patent application is a continuation of, and claims priority under 35 U.S.C. § 120 from, U.S. patent application Ser. No. 14/482,415, filed on Sep. 10, 2014, claims priority under 35 U.S.C. § 119(e) to U.S. Provisional Application 62/042,136, filed Aug. 26, 2014. The disclosures of these prior applications are considered part of the disclosure of this application and are hereby incorporated by reference in their entireties.

GOVERNMENT LICENSE RIGHTS

This invention was made with government support under HR00011-10-C-0025 awarded by the Defense Advanced Research Projects Agency. The government has certain rights in the invention.

BACKGROUND

A robotic device, such as a legged robot, may have a hydraulic drive system which, in operation, supplies pressurized hydraulic fluid to hydraulic actuators on the robotic device. For instance, the robotic device may have robotic arms and/or legs driven by hydraulic actuators (e.g., hydraulic piston-cylinder assemblies). Pressurized hydraulic fluid may cause the hydraulic actuators to actuate and thereby move the robotic arms and/or legs. An example legged robot may have one or more hydraulic actuators on each leg (e.g., hip, knee, and ankle actuators). A pump of the hydraulic drive system may pressurize hydraulic fluid. The hydraulic drive system may supply the pressurized hydraulic fluid to the hydraulic actuators on each leg. The hydraulic actuators may convert the pressure of the hydraulic fluid into force that moves the actuators, thus causing the legged robot to walk or run.

SUMMARY

In one example implementation, a control system of a robotic device may receive sensor data indicating at least one deviation from a nominal operating parameter of the robotic device, where the robotic device includes articulable legs that include respective actuators, and where one or more strokes of the actuators cause the articulable legs to articulate. Based on the received sensor data, the control system may determine that the at least one deviation exceeds a pre-determined threshold. In response to determining that the at least one deviation exceeds the pre-determined threshold, the control system may provide instructions for centering the one or more strokes at approximately a mid-point of extension of the actuators, and reducing a stroke length of the one or more strokes of the actuators.

In another example implementation, an example robotic device may include a frame, articulable legs, one or more sensors, and a control system. The articulable legs may include respective first members rotatably coupled to the frame, respective first hydraulic actuators coupled between the frame and the first members, respective second members rotatably coupled to the first member, and respective second hydraulic actuators coupled between the first members and the second members. The control system may include a processor and a data storage, the data storage containing instructions that, when executed by the processor, cause the processor to cause the first hydraulic actuators and the second hydraulic actuators to move the articulable legs according to a gait. The gait may involve one or more first strokes of the first hydraulic actuators and one or more second strokes of the second hydraulic actuators. The instructions may further cause the processor to receive data from the one or more sensors that indicates a transformation of the frame from a nominal orientation and based on the received sensor data, determine that a magnitude of the transformation exceeds a pre-determined threshold. Further, based on determining that the magnitude of the transformation exceeds the pre-determined threshold, the instructions may cause the processor to reduce a stroke length of the one or more first strokes, and center the one or more second strokes at approximately a mid-point of extension of the second hydraulic actuators.

Another example implementation may involve causing, by a control system of a robotic device, the robotic device to move according to a first gait, where the robotic device comprises two or more legs coupled to a frame, and where the two or more legs include respective hip joints and respective knee joints. moving according to the first gait may involve actuating the respective hip joints in a first range from approximately full extension of the hip joints to approximately full flexion of the hip joints, and actuating the respective knee joints in a second range centered near full extension of the knee joints. The implementation may also involve receiving sensor data that indicates a transformation of the frame from a nominal orientation. Based on the received sensor data, the implementation may further involve determining that a magnitude of the transformation exceeds a pre-determined threshold. In response to determining that the magnitude of the transformation exceeds the pre-determined threshold, the implementation may involve causing the robotic device to move according to a second gait. Moving according to the second gait may involve actuating the respective hip joints in a third range from partial extension of the hip joints to partial flexion of the hip joints, and actuating the respective knee joints in a fourth range centered at approximately a mid-point between full extension of the respective knee joints and full flexion of the respective knee joints.

Another example implementation may include a means for receiving sensor data indicating at least one deviation from a nominal operating parameter of the robotic device. The robotic device may include articulable legs that include respective hydraulic actuators, and one or more strokes of the hydraulic actuators may cause the articulable legs to articulate. The implementation may include a means for determining that the at least one deviation exceeds a pre-determined threshold based on the received sensor data. The implementation may also include a means for centering the one or more strokes at approximately a mid-point of extension of the hydraulic actuators in response to determining that the at least one deviation exceeds the pre-determined threshold. The implementation may further include a means for reducing a stroke length of the one or more strokes of the hydraulic actuators in response to determining that the at least one deviation exceeds the pre-determined threshold.

These as well as other aspects, advantages, and alternatives, will become apparent to those of ordinary skill in the art by reading the following detailed description, with reference where appropriate to the accompanying figures.

DETAILED DESCRIPTION

Figure 1:
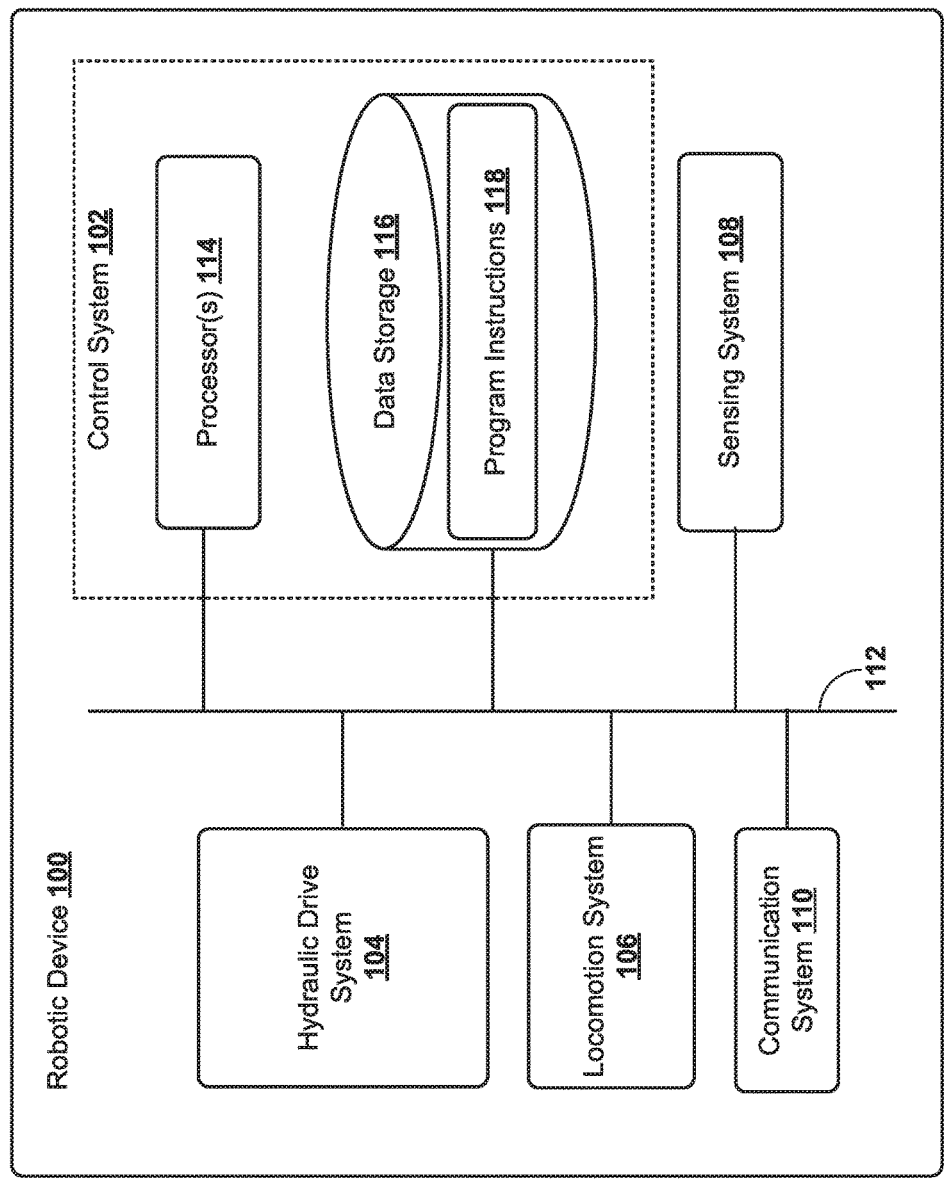
FIG. 1 is a simplified block diagram illustrating components of an example robotic device.

Example methods and systems are described herein. Any example implementation or feature described herein is not necessarily to be construed as preferred or advantageous over other implementations or features. The example implementations described herein are not meant to be limiting. Certain aspects of the disclosed systems and methods can be arranged and combined in a wide variety of different configurations, all of which are contemplated herein.

Furthermore, the particular arrangements shown in the figures should not be viewed as limiting. Other implementations might include more or less of each element shown in a given figure. Further, some of the illustrated elements may be combined or omitted. Yet further, an example implementation may include elements that are not illustrated in the figures.

A legged robotic device, such as a bipedal or quadruped robot, may have a body (e.g., a frame) connected to one or more articulable legs. The one or more legs may include one or more actuators (e.g., hydraulic, pneumatic, or electrical actuators), which may cause the leg to move according to a gait. In some circumstances, the legged robotic device may fall down, leave its feet, or enter an unstable configuration, which in some cases may result in damage to the robotic device. Before falling, the robotic device may take measures to prevent or reduce damage to the robotic device.

To facilitate detecting an impending unstable position, a legged robotic device may be equipped with one or more sensors. For instance, the legged robotic device may include one or more sensors which produce data indicating the legged robotic device's position, orientation, and/or velocity (e.g., an inertial measurement unit). Further, the robotic device may have one or more sensors that produce data indicating various operating parameters of the robotic device. For instance, the robotic device may include one or more pressure gauges that indicate engine oil pressure or hydraulic oil pressure, and such pressures may deviate from nominal pressures before and/or during a crash or other failure of the robotic device. The robotic device may also include a tachometer that indicates engine speed, and in some examples, decreasing engine speed may indicate an increased possibility that the robotic device may enter an unstable configuration.

Based on the data produced by the one or more sensors, including data indicating the legged robotic device's position, orientation, and/or velocity, the robotic device may determine that one or more conditions have occurred giving rise to an increased probability of an unstable position or impending crash. For instance, based on data from an inertial measurement unit, the robotic device may determine that the body roll and/or body pitch has exceeded a pre-determined threshold (which may be, for example, in the range of about 0.6 radians (rad) to about 0.9 rad from nominal orientation). Alternatively, the robotic device may determine that body roll rate and/or body pitch rate has exceeded a pre-determined threshold (which may be, for example, in the range of about 2.5 rad/s to about 3.5 rad/s from nominal rate (0/s)). In another instance, based on data from an inertial measurement unit, the robotic device may determine that body height (i.e., the height of the IMU) has deviated from a nominal height by an amount greater than a pre-determined threshold (which may be, for example, 0.2 meters, but may vary based on the mounting position of the IMU).

Further, alternatively or perhaps in combination with one or more of the conditions noted above, the robotic device may determine that one or more conditions have occurred based on data from the one or more sensors that indicate various operating parameters of the robotic device. Such conditions may involve one or more deviations from nominal operating parameters that are greater than respective pre-determined thresholds, which may indicate that a crash is impending. For instance, the robotic device may determine that the engine speed has decreased below a pre-determined threshold (e.g., below 1000 revolutions per minute (RPM) where the nominal engine range is 3000-7000 RPM). Or the robotic device may determine that pressure has decreased below a pre-determined threshold.

After determining that a failure is impending, the robotic device may be programmed take certain actions within its gait, which may reduce or prevent damage to the robotic device during the failure. For instance, the robotic device may adjust the nominal extension of the actuators of the legs from near full extension to approximately the mid-point of extension. Such adjustment may cause the robotic device to "squat", lowering the robotic device's center of gravity. The robotic device may also limit the stroke of the hydraulic actuators (e.g., to within 25% of the stroke length from the mid-point of extension). Such a limitation on the stroke may change the gait of the robotic device to shorter, quicker steps. In addition, the robotic device may reduce the velocity of its body relative to the ground, perhaps by way of the shorter, quicker steps.

Further, the robotic device may take actions to prepare for impact, which may also reduce or prevent damage sustained by the robotic device during the crash. Such actions may include causing the hydraulic actuators to move to approximately the mid-point of extension. The robotic device may then cause the hydraulic actuators to offset impact forces, which may cause the hydraulic actuators to function as dampeners (i.e., as springs). Then, one or more of the hydraulic actuators may dampen an impact on one or more of the articulable legs. Other actions are possible as well.

Referring now to the figures, FIG. 1 is a simplified block diagram illustrating components of an example robotic device 100. The robotic device 100 may include a control system 102, a hydraulic drive system 104, a locomotion system 106, a sensing system 108, and a communication system 110. One or more of these components may be interconnected by a bus or other interconnection system 112.

The control system 102 may include one or more processors 114, non-transitory data storage 116, and program instructions 118 stored on the data storage 116. The one or more processors 114 may, for example, include a single or multi-core processor, an application specific integrated circuit (ASIC), field programmable gate array (FPGA), and/or any other suitable circuitry. The program instructions 118 stored on the data storage 116 may be executable by the one or more processors 114 to perform specific operations, which may include the specific operations described herein.

The hydraulic drive system 104 may include various components that operate to provide pressurized hydraulic fluid to hydraulic actuators of the robotic device 100. These components may include, for example, a hydraulic pump complex, a switch valve complex, and a metering valve. While a hydraulic drive system is described by way of example, some implementations may use an electrical drive system or a pneumatic drive system, among other examples.

The hydraulic pump complex may include one or more pumps, one or more accumulators, one or more reservoirs, and pressure rails. In operation, the hydraulic pump complex may provide a source of pressurized hydraulic fluid including pressure rails at respective pressures. For instance, the hydraulic pump complex may provide two, three, four, or five pressure rails.

The one or more pumps may support pressurizing hydraulic fluid to a particular pressure (e.g., 3000 PSI). A motor, such as fuel-powered internal combustion engine or a battery-powered electric motor, may drive the one or more pumps. A control system may vary the speed of the motor, thereby varying the speed of the one or more pumps, which results in increased or decreased pressure of the pumped hydraulic fluid.

The hydraulic pump complex may include a multi-pressure valve connected between the one or more pumps (e.g., a fixed displacement pump that provides a constant pressure) and the pressure rails. Each pressure rail (e.g., a tube or pipe) may connect to a respective one of the one or more accumulators. In operation, a control system may cause the multi-pressure valve to selectively connect the one or more pumps to each of the pressure rails for a period of time (e.g., 100 milliseconds). While a pressure rail is connected to the pump, pressurized hydraulic fluid may flow from the pump to the pressure rail. Some pressurized hydraulic fluid may be stored in the respective accumulator for the pressure rail. The multi-pressure valve may vary the pressure of the pressure rail by varying how often the fixed displacement pump is connected to the pressure rail. More frequent connections from the fixed displacement pump to the pressure rail result in a higher pressure at the pressure rail, as more pressurized fluid flows to the pressure rail. Conversely, less frequent connections from the fixed displacement pump to the pressure rail result in a lower pressure at the pressure rail. For instance, every 1.5 seconds, the multi-pressure valve may connect a first pressure rail for 800 ms, a second pressure rail for 400 ms, a third pressure rail for 200 ms, and a fourth pressure rail for 100 ms.

As noted above, multi-pressure valve may vary the pressure of a pressure rail by varying how often one or more pumps are connected to the pressure rail. As pressurized hydraulic fluid flows from the pressure rails to other components of the hydraulic drive system, the control system may maintain the pressure rails at different pressures by adjusting how frequently or for how long the one or more pumps are connected to any pressure rail. The respective accumulator for the pressure rail may maintain the pressure of the pressure rail while while the pump is servicing other pressure rails.

For instance, respective pressure sensors on the pressure rails may indicate the pressure of each pressure rail. Based on data from a pressure sensor, the control system may detect that the pressure of one of the pressure rails is lower than the nominal pressure of the pressure rail (e.g., that a 3000 PSI pressure rail has dropped to 2950 PSI). In response, the control system may connect the one or more pumps to the pressure rail more often or for a longer duty cycle, which may in turn maintain the pressure of the pressure rail and/or replenish pressurized hydraulic fluid in the accumulator. In some cases, such as when the respective accumulators have reached nominal (desired) pressure levels, the multi-pressure valve may connect the pump to the one or more reservoirs, one of which may be a return reservoir (i.e., a store of hydraulic fluid for the one or more pumps). In this manner, the hydraulic pump complex may provide pressurized hydraulic fluid at or approximately at respective pressures.

The switch valve complex may include multiple inputs, one or more switches 116, and one or more outputs. The one or more inputs may connect to respective pressure rails of the hydraulic pump complex. In some implementations, a control system may cause the one or more switches to selectively connect one of the one or inputs to a single output of the one or more outputs, thereby allowing pressurized hydraulic fluid to flow from the connected pressure rail to the single output, which may then in turn connect to another component of the hydraulic drive system 104. In some cases, the inputs and outputs may reverse operation and become outputs and inputs, respectively. In this configuration, one or more hydraulic actuators connected to the input (previously the output) may push pressurized hydraulic fluid back through the switch valve complex to the respective pressure rails, which may result in regenerating some energy. In other implementations, the one or more switches may selectively connect two or more of the multiple inputs to respective outputs of the one or more outputs. Such an arrangement may facilitate connecting pressure rails at different pressures to different outputs, which may in turn connect to different hydraulic actuators.

The metering valve includes at least one input, at least one throttle, and at least one output. In operation, the at least one throttle may restrict the flow of hydraulic fluid flowing from the at least one input to the at least one output. Such restriction may lower the pressure of the hydraulic fluid. The at least one throttle may be adjustable, such that it may throttle hydraulic fluid flowing from the at least one input to the at least one output by a varying degree. A control system may connect to the at least one throttle and adjust the at least one throttle. In some cases, the control system may open the at least one throttle such that the pressure of hydraulic fluid flowing through the at least one throttle is not substantially lowered. In some implementations, the at least one throttle may be an electrically operated valve, such as an electro-hydraulic servovalve. The control system may connect to such an electrically operated valve and cause the valve to open or close to various positions.

Some implementations of the switch valve complex may include the metering valve. For instance, the switch valve complex may include one or more switches and one or more throttles. In such an example, a throttle may be in line of a flow of hydraulic fluid from an input to an output. Such a configuration may result in quicker hydraulic pressure adjustments, among other possible benefits.

The locomotion system 106 may include one or more limbs (e.g., one or more legs and/or one or more arms). In some implementations, the robotic device 100 may be a biped (i.e., a two-legged robot). In other implementations, the robotic device 100 may be a quadruped (i.e., a four-legged robot). In yet further implementations, the robotic device 100 may have three legs or six legs. Many alternatives are possible.

Each limb may be divided into one or more members. The members may be rotatably connected at one or more joints (e.g., for a leg, the limb may have "ankle," "knee," and/or "thigh" joints). One or more actuators (e.g., hydraulic, pneumatic, or electrical actuators) may move the one or more members in relation to one another, causing the robotic device to walk or run.

The sensing system 108 may include sensors arranged to sense aspects of the robotic device 100 and the environment in which the robotic device 100 is operating. The sensing system 108 may connect to the control system 102 and thereby provide the control system 102 with data from the sensors. The control system 102 may track and store this sensor data and make operational determinations based on the tracked sensor data.

As noted above, the sensing system 108 may include sensors arranged to sense aspects of the robotic device. The sensing system 108 may include one or more force sensors arranged to measure load on various components of the robotic device 100. In one example, the sensing system 108 may include one or more force sensors on each leg. Such force sensors on the legs may measure the load on the hydraulic actuators that may move one or more members of the leg.

The sensing system 108 may include one or more pressure sensors. One or more pressure sensors may measure the pressure of the hydraulic fluid supplied to the hydraulic actuators. For instance, the sensing system 104 may include a pressure sensor on each pressure rail. One or more pressure sensors, or pressure gauges, may measure oil pressure, such as engine oil pressure or hydraulic oil pressure, among other examples.

The sensing system 108 may include one or more position sensors. Position sensors may sense the position of the hydraulic actuators of the robotic device. Position sensors may also sense the positions of the hydraulic actuators. In one implementation, position sensors may sense the extension or retraction of the hydraulic actuators on the legs of the robotic device.

The sensing system 108 may include one or more position, velocity, or acceleration sensors. For instance, the sensing system 108 may include an inertial measurement unit (IMU). The inertial measurement unit may sense the robotic device's velocity, orientation, and acceleration. The sensing system may include one or more global positioning system (GPS) devices. The GPS may sense the robotic devices absolute positions. The control system may use GPS data to determine the robotic device's speed or direction, possibly in combination with data from the IMU.

The sensing system 108 may include one or more perception sensors arranged to sense the environment in which the robotic device 108 is operating. One or more of the perception sensors may be mounted on the robotic device 108 and oriented in the direction of locomotion. Such sensors may sense physical features of the environment, such as the terrain, vegetation, man-made objects and structures, and the like. In some implementations, the perception sensors may include one or more lidar systems. Such lidar systems may generate data indicating a map or model of the physical features of the environment, which may then be used by the control system to navigate the robotic device, perhaps in combination with sensor data from the other sensors. In some implementations, the perception sensors may include one or more cameras, such as one or more stereo cameras. For example, one or more stereo cameras may generate three-dimensional images of the physical features of the environment. The control system may evaluate the three-dimensional images to identify the physical features and their position relative to the robotic device. The perception sensors may also include one or more range finders, such as one or more laser range finders, which may generate data indicating distances from the robotic device to the physical features of the environment. The sensing system 410 may include other types of perception sensors as well.

The communication system 110 may include one or more wired or wireless communication interfaces that operate according to one or more communications protocols to facilitate data communications between the robotic device and other devices. For example, the communication system 110 may include a Wi-Fi communication component that is configured to facilitate wireless data communication according to one or more IEEE 802.11 protocols. Alternatively, the communication system 110 may include a cellular radio communication component that is configured to facilitate wireless communication (voice and/or data) with a cellular wireless base station to provide mobile connectivity to a network. Many other communication interfaces are known and available and the robotic device may include any suitable communication interface.

Figure 2:
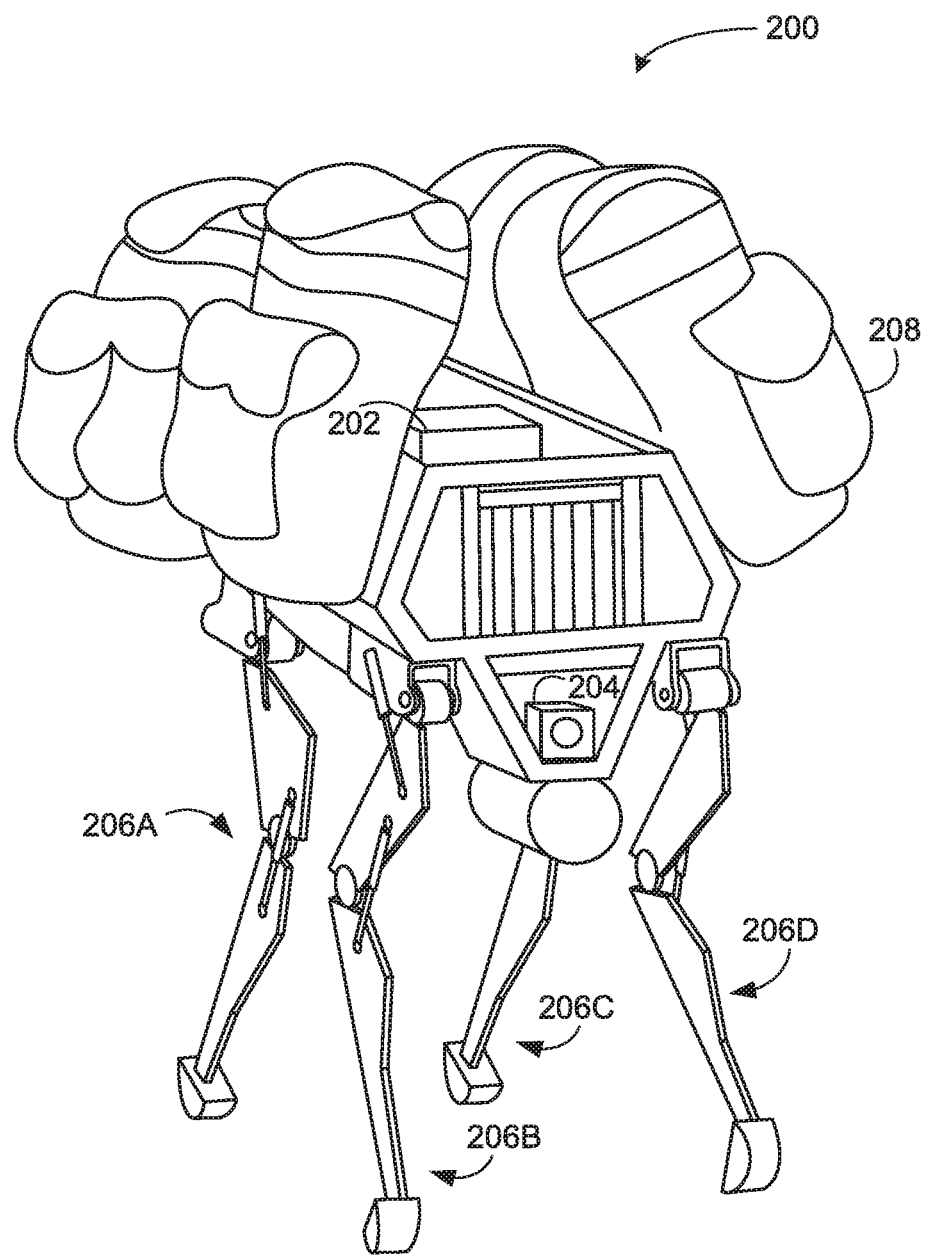
FIG. 2 is a perspective view of an example legged robotic device.

FIG. 2 is a perspective view of an example legged robotic device 200. Robotic device 200 includes a control system 202, a hydraulic drive system (not shown), a locomotion system that includes legs 206A, 206B, 206C, and 206D, and a sensing system, of which perception sensor 204 is shown. Robotic device 200 is carrying a load 208. As examples, the control system 202, the hydraulic drive system, the locomotion system, and the sensing system of legged robotic device 200 may be implemented as control system 102, hydraulic drive system 104, locomotion system 106, and sensing system 108, respectively, among other examples.

Control system 202 of robotic device 200 may cause the robotic device 200 to navigate an environment based on sensor data from the sensing system. As noted above, the sensing system may include sensors of sensing system 108 (e.g., perception sensor 204). The robotic device 200 may receive navigation commands by way of a communication system, such as communication system 110. For instance, the robotic device 200 may receive a command to move forward at 5 kilometers per hour. The command may specify to walk forward for a particular distance, such as 100 meters.

In some examples, the navigation commands may involve GPS coordinates. In one instance, a command may instruct the robotic device 200 to navigate to a particular position, which may be defined by particular GPS coordinates. The robotic device 200 may then cause the locomotion system to move to the position while navigating physical features of the terrain identified by the control system 202 (perhaps based on data from the perception sensor 204). Another command may instruct the robotic device 200 to follow a particular person, who may have with them a GPS enabled device that generates data indicating the position of the person. The data may be communicated to the robotic device 200 which may then cause the locomotion system to follow the person while navigating physical features of the terrain identified by the control system 202.

Figure 3A:
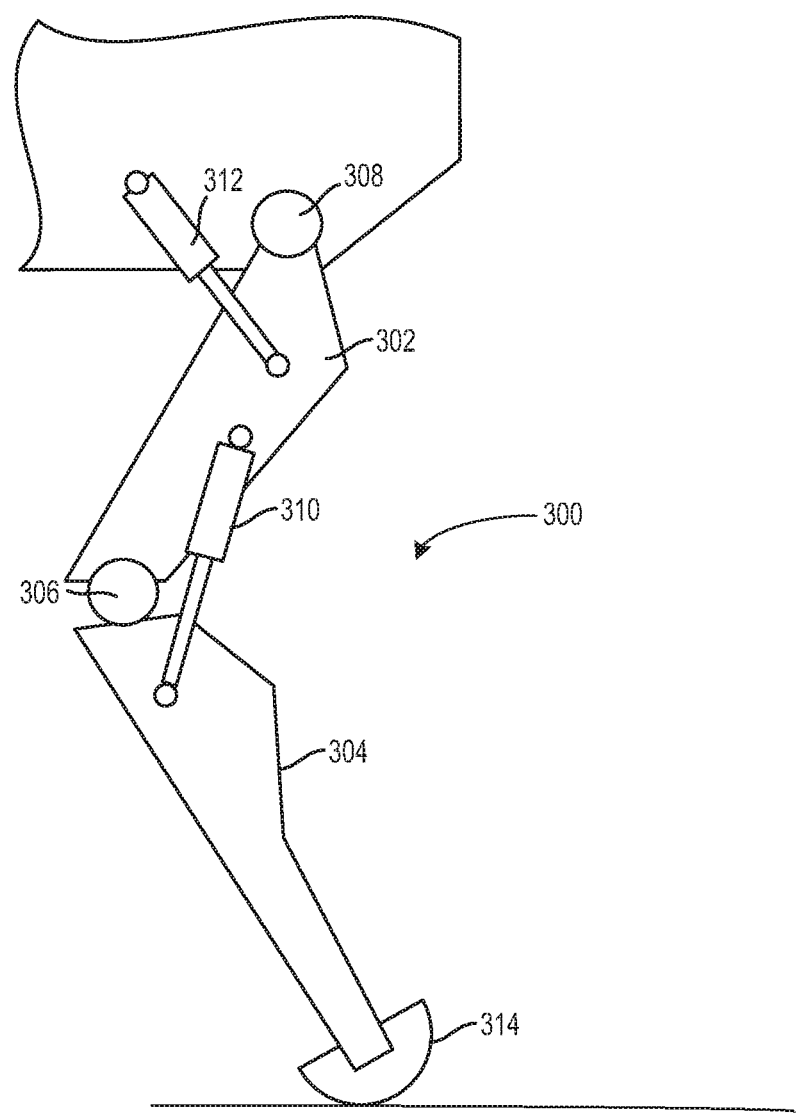
FIG. 3A is a side-view of an example robotic leg in a first arrangement.

FIG. 3A is a side-view of an example articulable robotic leg 300. The robotic leg includes a member 302 having a first end that is connected to the robotic device at joint 308 (a "hip" joint"). The member 302 has a second end that is rotatably connected to a first end of a member 304 at joint 306 (a "knee" joint). The member 304 has a second end that is connected to a foot member 314. The example robotic leg 300 also includes a linear hydraulic actuator 312 connected between the member 304 and the robotic device. Actuation of the linear hydraulic actuator 312 causes the member 302 and the member 304 to rotate around joint 308. Similarly, actuation of the linear hydraulic actuator 310 causes the member 304 to rotate around the joint 306.

Figure 3B:
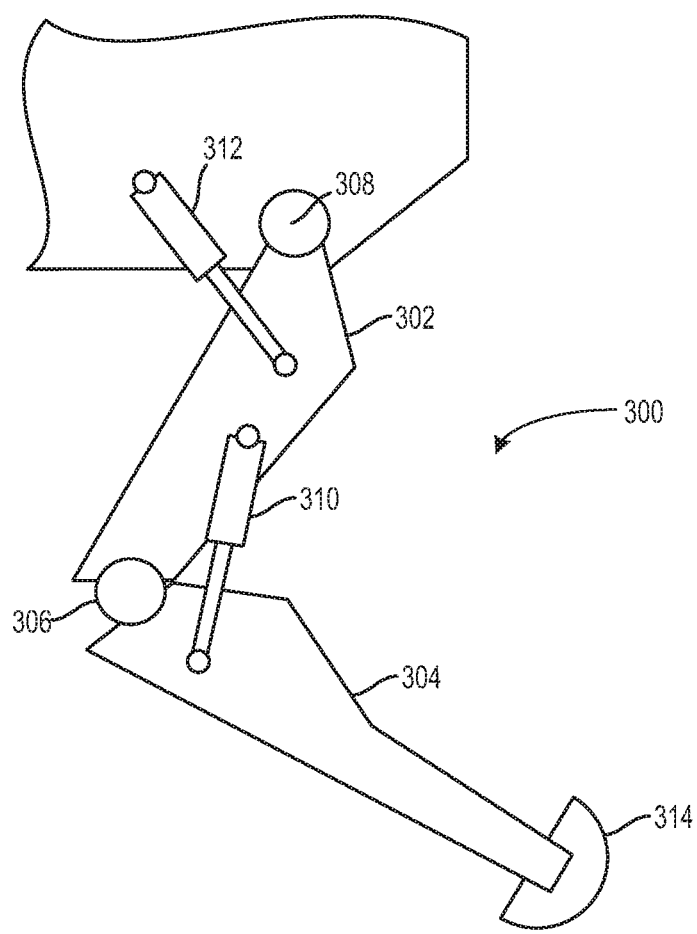
FIG. 3B is a side-view of the example robotic leg in a second arrangement.

Actuating the linear hydraulic actuator 310 and the linear hydraulic actuator 312 in combination may cause the leg 300 to take a step. For instance, linear hydraulic actuator 310 may retract, which causes member 304 to rotate counter-clockwise around joint 306. This rotation may raise the leg 300 up from the ground, as shown in FIG. 3B. Linear hydraulic actuator 312 may then retract, which causes member 302 to rotate clockwise around joint 308. By rotating member 302 clockwise around joint 308, foot member 314 moves forward relative to the ground. Linear hydraulic actuators 310 and 312 may then extend and thereby cause leg 300 to lower and push against the ground, thereby causing the robotic device to move forward.

Actuation of a linear hydraulic actuator, such as linear hydraulic actuator 310 or 312, may be referred to as a stroke. Some linear hydraulic actuators may actuate along a stroke length from full retraction to full extension. A given stroke may involve the entire stroke length, or perhaps a portion of the stroke length. For a given load, a hydraulic drive system may vary a stroke rate of a linear hydraulic actuator by supplying pressurized hydraulic fluid at a higher or a lower pressure.

Referring back to FIG. 2, a locomotion system, such as locomotion system 106, may move the robotic device 200 according to a gait. The gait is a pattern of movement of the legs of a robotic device. The pattern of movement may involve a cyclical sequence of actuations by the hydraulic actuators. During a cycle of the gait, each leg may perform a stepping sequence, such as the stepping sequence described above. For instance, a bipedal robot may step a right leg and then a left leg during one cycle of a gait. Alternatively, the bipedal robot may move the right leg and the left leg at the same time, perhaps in a relatively faster gait.

A robotic device may alternate between several different gaits. For instance, a bipedal robot may alternate between a walking gait and a running gait. A quadruped robot may alternate between a walk, a run, and a gallop, among other possible gaits. A robotic device may move according to different gaits by varying the timing of actuation, speed of actuation, and range of actuation of the hydraulic actuators. The particular gaits that a particular robotic device is capable of performing may depend upon the range of motion of its legs and the robotic device's ability to actuate the hydraulic actuators with sufficient acceleration. The range of motion of its legs may in turn depend upon the leg length and range of travel of the linear actuators. Acceleration of the actuators is proportional to the pressure of the hydraulic fluid used to actuate the hydraulic actuator—with a given load, higher pressure results in greater acceleration. The control system may select a particular gait based on factors such as speed, terrain, the need to maneuver, and/or energy efficiency. For instance, a robotic device may transition from a walk to a run as speed of locomotion is increased. The robotic device may then transition back to a walk on uneven terrain, as such a gait may aid in maintaining balance on the uneven terrain, among other effects.

Load on the hydraulic actuators may vary during the stepping sequence. During the portion of the gait in which the hydraulic actuators are causing a leg to push against the ground, the load on the hydraulic actuators is relatively large compared to the portion of the gait in which the hydraulic actuators are raising the leg and stepping forward. As the load varies, the robotic device may vary the pressure supplied by the hydraulic drive system to maintain the movement of the legs according to the gait.

As noted above, an example robotic limb may have various joints, such as hip, knee, and/or ankle joints. Movement of these joints may be described using anatomical terms of motion. Flexion and extension are anatomical terms of motion that may describe movements that affect the angle between two parts of the body. Flexion may refer to a bending movement that decreases the angle between two parts of the body (e.g., two members of a leg, or between a frame of the robotic device and a member of the leg). For instance, flexion of the hip joint may involve to a movement of the leg forward relative to the frame. Flexion of the knee joint may involve to a bending of the knee joint. Conversely, extension may refer to a straightening movement that increases the angle between body parts. For example, extension of the hip joint and the knee joint may involve a movement of the leg backward relative to the frame and a straightening of the knee joint, respectively. Either extension or retraction of a hydraulic actuator may cause either flexion or extension of a joint, depending on the arrangement of the hydraulic actuator in relation to the joint.

Anatomical terms of motion may also describe respective ranges of motion for the joints. For instance, a range of motion for a knee joint may extend from full flexion to full extension. Full flexion may describe the position of the knee joint in which the angle between two leg members is at the minimum (e.g., a fully-bent knee joint). In contrast, full extension may describe the position of the knee joint in which the angle between two leg members is at the maximum (e.g., an arrangement in which the leg is straight). As another example, full flexion and full extension of the hip joint may describe the position of the hip joint in which the leg is swung forward to the furthest extent of the joint and the position in which the leg is swung backward to the furthest extent of the joint, respectively. However, in some circumstances, hyper-extension or hyper-flexion of a joint beyond its nominal range of motion may occur, perhaps due to forces on the joint (e.g., impact forces).

During a cycle of a gait, a joint may undergo flexion and/or extension. For instance, in an example gait, hydraulic actuators may cause a hip joint to undergo flexion and extension in a range from approximately full extension (e.g., 75%-100% of full extension) to approximately full flexion (e.g., 75%-100% of full extension). During a gait, the range of movement of the joints may be centered at various points across the range of motion. For instance, hydraulic actuators may cause a knee joint to undergo flexion and extension in a range centered near full extension. Such a gait may allow the robotic device to take longer steps.

FIGS. 4A-4D illustrate a robotic device 400 at various example positions during an example gait. Robotic device 400 may be implemented as robotic device 100 of FIG. 1 or as robotic device 200 of FIG. 2, among other examples. Robotic device 400 includes a frame 402 to which articulable legs 404A, 404B, 404C, and 404D are connected. Legs 404A, 404B, 404C, and 404D may be respectively implemented as robotic leg 300 of FIG. 3. Legs 404A, 404B, 404C, and 404D include respective first members rotatably coupled to the frame 400 (forming respective "hip joints"), respective first linear hydraulic actuators coupled between the frame and the first members ("hip actuators"), respective second members rotatably coupled to the first member (forming respective "knee joints"), and respective second linear hydraulic actuators coupled between the first members and the second members ("knee actuators"), as shown.

Figure 4A:
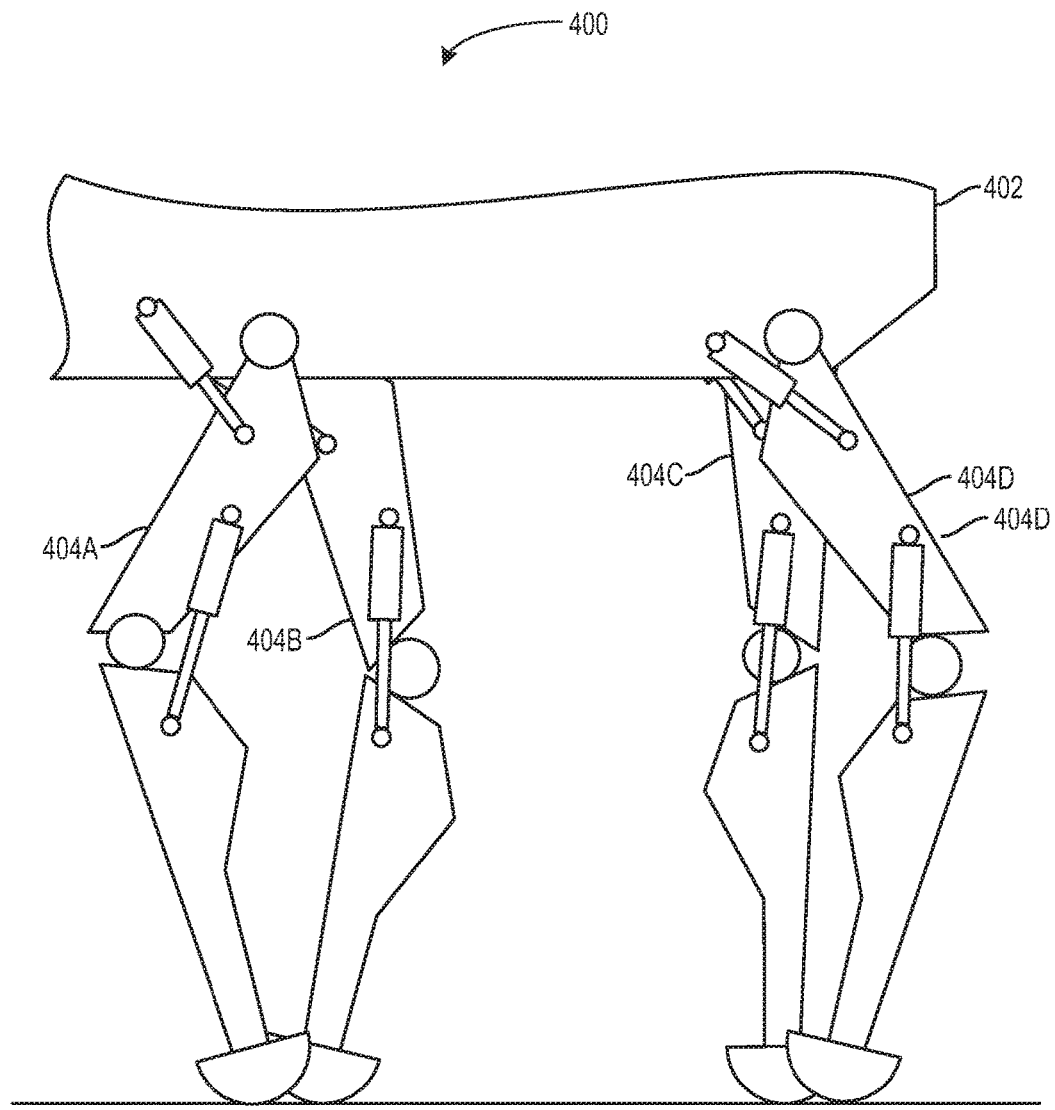
FIGS. 4A, 4B, 4C, and 4D illustrate an example robotic device moving according to an example gait.

FIG. 4A may represent an initial, or nominal position, in which the robotic device is balanced on legs 404A, 404B, 404C, and 404D. The respective hip actuators are near respective mid-points of their stroke between full extension and full retraction. In this implementation, such a position causes the respective hip joints to be approximately at mid-points between full flexion and full extension (e.g., within 20% of the range from the mid-point). The respective knee actuators are also at respective mid-points of their stroke between full extension and full retraction, which causes the respective knee joints to be approximately at mid-points between full flexion and full extension (e.g., within 20% of the range from the mid-point).

Figure 4B:
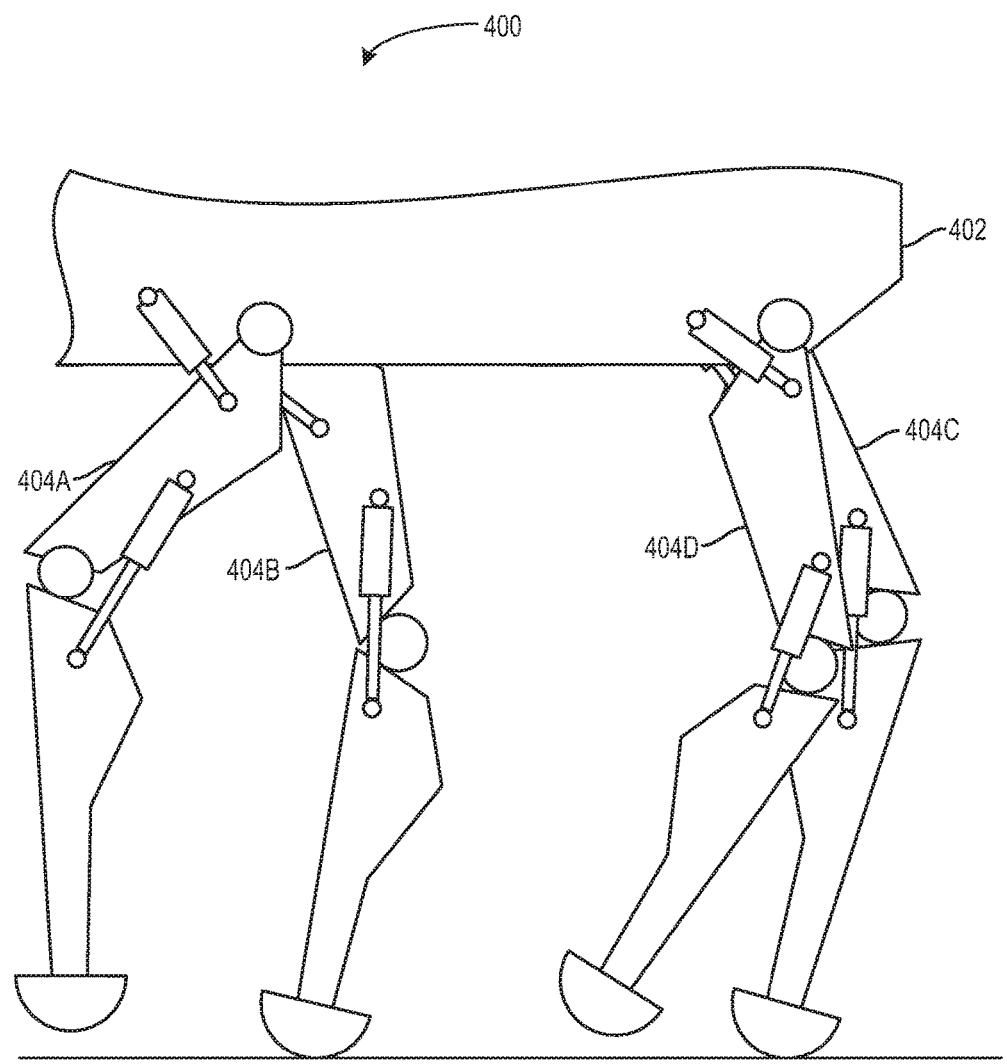

Then, in FIG. 4B, legs 404A and 404D may step forward. To step forward, the respective hip joints of legs 404A and 404D may undergo flexion caused by retraction of the respective hip actuators. In addition, the respective knee joints of legs 404A and 404D may undergo flexion caused by retraction of the respective knee actuators, which may create separation between legs 404A and 404D and the support surface, as shown.

Figure 4C:
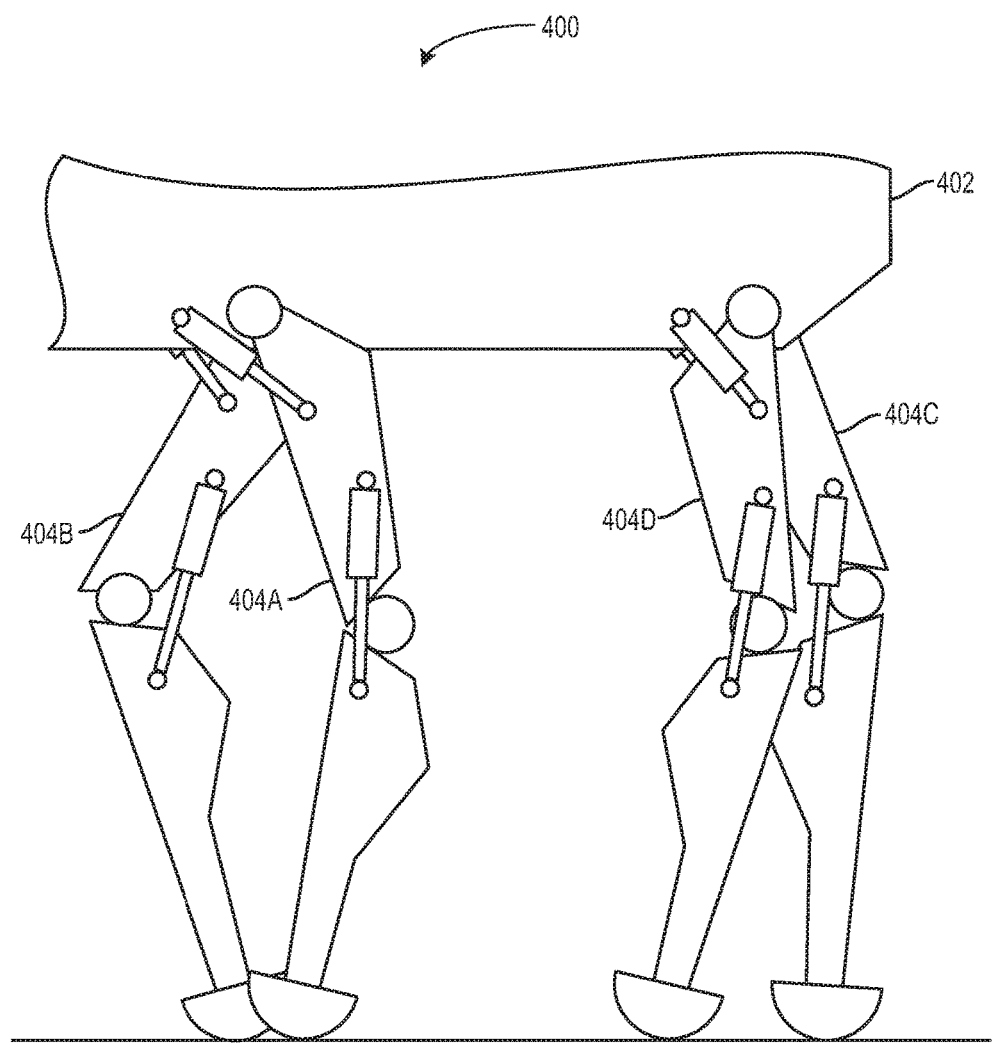

In FIG. 4C, legs 404A and 404D may lower to make contact with the support surface. Relative to FIG. 4B, the respective hip joints of legs 404A and 404D undergo extension caused by extension of the respective hip actuators. The respective knee joints of legs 404A and 404D may undergo extension caused by some extension of the respective knee actuators.

Figure 4D:
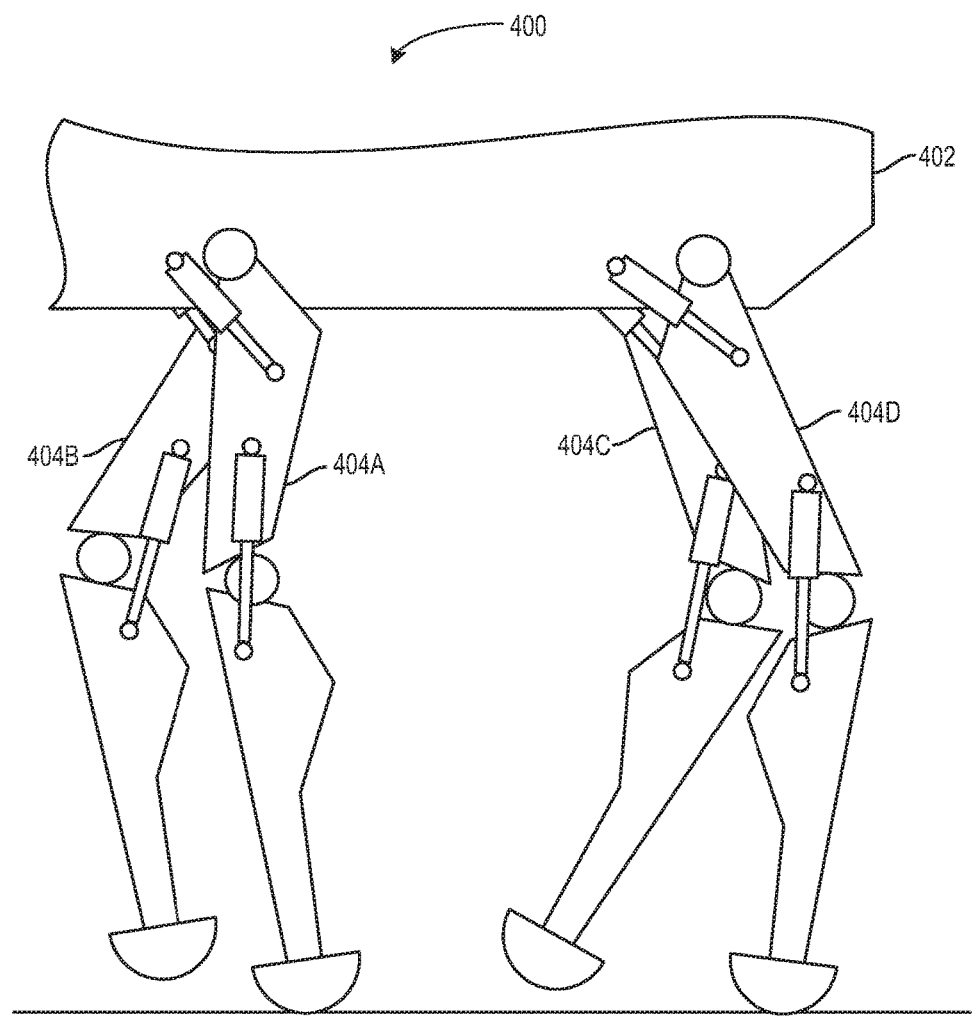

Relative to FIG. 4C, in FIG. 4D, legs 404A, 404B, 404C, and 404D have undergone movement. Legs 404A and 404D may swing backward to move the frame forward relative to the support surface. To swing backward, the respective hip joints of legs 404A and 404D undergo further extension caused by extension of the respective hip actuators. The respective knee joints of legs 404A and 404D may undergo some further extension caused by extension of the respective knee actuators. Legs 404B and 404C may step forward. To step forward, the respective hip joints of legs 404B and 404C may undergo flexion caused by retraction of the respective hip actuators. In addition, the respective knee joints of legs 404B and 404C may undergo flexion caused by some retraction of the respective knee actuators, which may create separation between legs 404B and 404C and the support surface.

Figure 5:
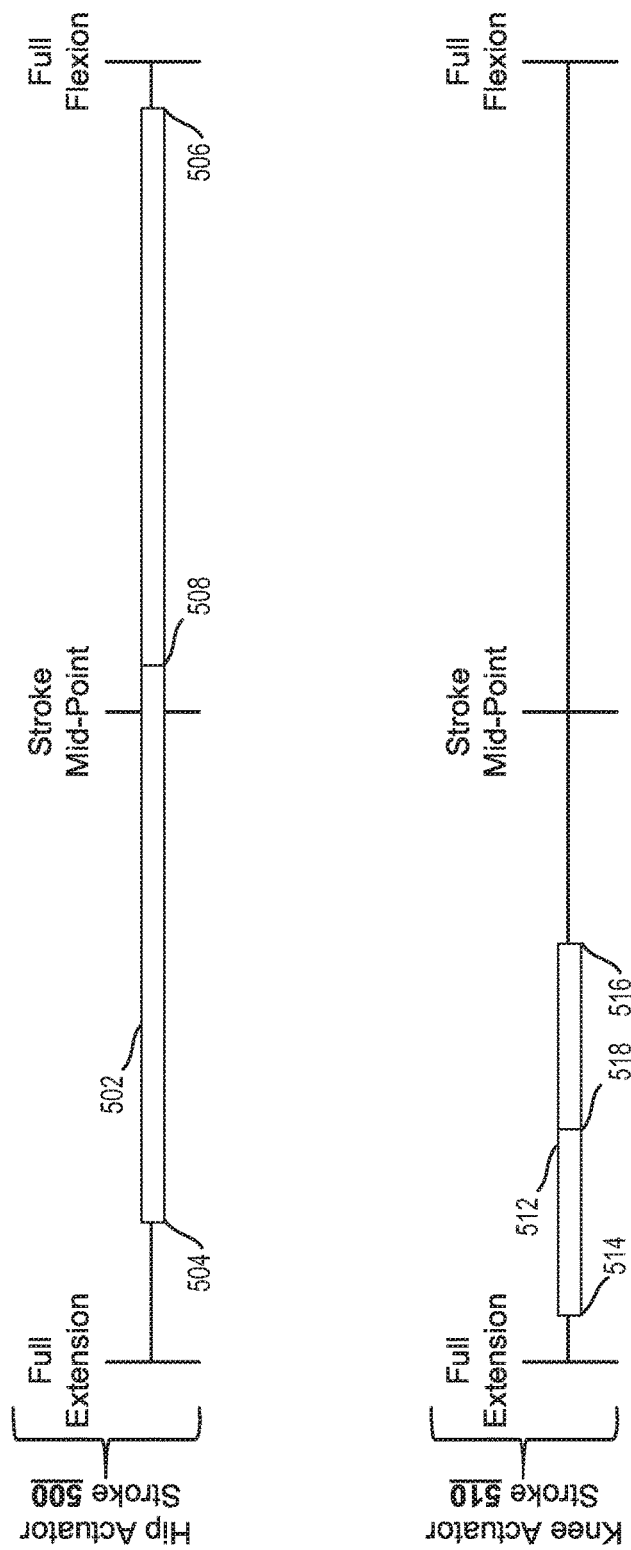
FIG. 5 shows respective example strokes of example hip actuators and example knee actuators.

FIG. 5 shows an example hip actuator stroke 500 and an example knee actuator stroke 510. Hip actuator stroke 500 represents a range of actuation of the respective hip actuators of legs 404A, 404B, 404C, and 404D. The range of actuation of the respective hip actuators extends from full extension of the hip joint to full flexion of the hip joint, as shown. Knee actuator stroke 502 represents a range of actuation for the respective knee actuators of legs 404A, 404B, 404C, and 404D. The range of actuation of the respective knee actuators extends from full extension of the knee joint to full flexion of the knee joint, as shown.

As noted above, a gait may involve a series of strokes of respective linear hydraulic actuators. A given stroke of the gait may involve the entire stroke length, or a portion of the stroke length. Stroke range 502 represents the hip actuator stroke range of the example gait illustrated in FIGS. 4A-4D. To move according to that example gait, the robotic device 400 may actuate the respective hip joints in the stroke range 502 from approximately full extension of the hip joints (at point 504) to approximately full flexion of the hip joints (at point 506). Further, the robotic device may center the stroke range 502 at point 508, which in this example is slightly offset from the stroke mid-point, as shown.

Stroke range 510 represents the knee actuator stroke range of the example gait illustrated in FIGS. 4A-4D. To move according to that example gait, the robotic device 400 may actuate the respective knee joints in the stroke range 510 from point 514 to point 516. Further, the robotic device may center the stroke range 510 at point 518, which in this example is near full extension of the knee joints, as shown.

Figure 6:
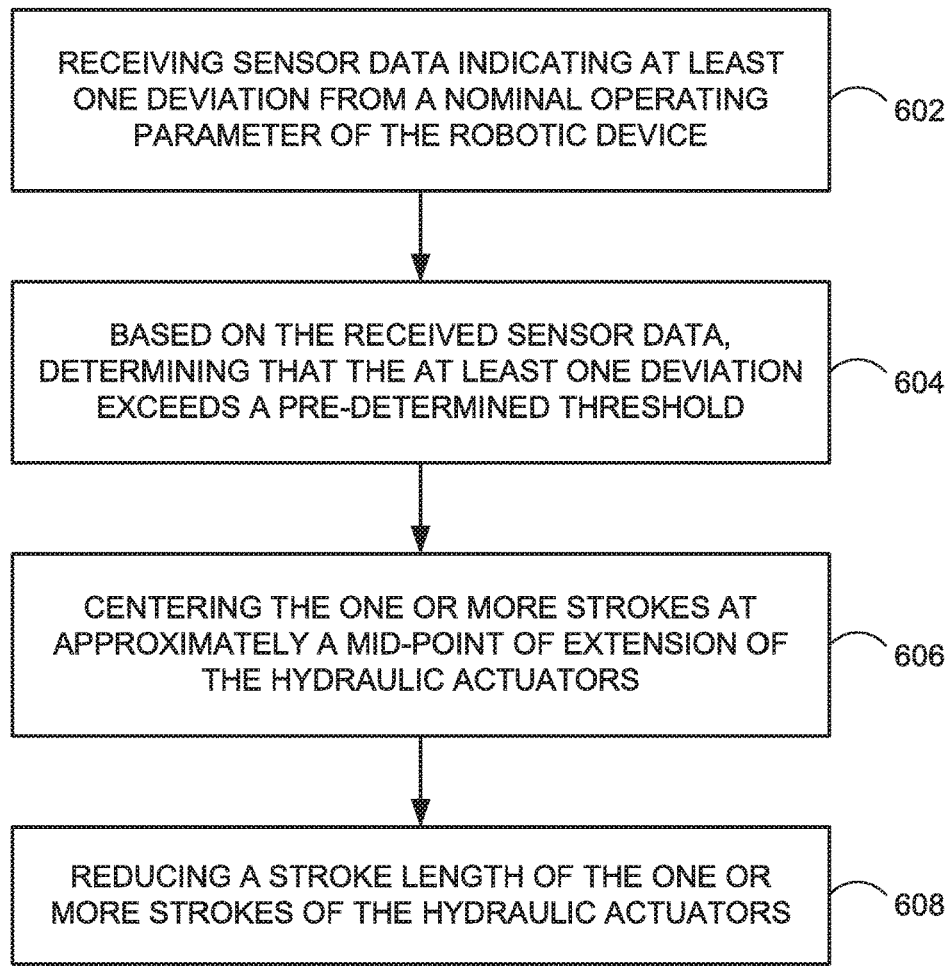
FIG. 6 is a flow chart illustrating an example method for facilitating operations taken based on detection of an impending unstable configuration of a robotic device.

FIG. 6 is a flowchart illustrating example operations taken based on detecting an unstable configuration of a robotic device. These operations, for example, could be used with the robotic device 100 in FIG. 1, the robotic device 200 in FIG. 2, and/or the robotic legs 300 in FIGS. 3A and 3B, for example, or may be performed by a combination of any components of the robotic device 100 in FIG. 1, the robotic device 200 in FIG. 2, and/or the robotic legs 300 in FIGS. 3A and 3B. FIG. 6 may include one or more operations, functions, or actions as illustrated by one or more of blocks 602-608. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for FIG. 6 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include a non-transitory computer-readable medium, for example, such as computer-readable media that stores data for short periods of time like register memory, processor cache and random access memory (RAM). The computer-readable medium may also include other non-transitory media, such as secondary or persistent long term storage, like read only memory (ROM), optical or magnetic disks, compact-disc read only memory (CD-ROM), for example. The computer-readable media may also be any other volatile or non-volatile storage system. The computer-readable medium may be considered a computer-readable storage medium, a tangible storage device, or other article of manufacture, for example. The program code (or data for the code) may also be stored or provided on other media including communication media. For instance, the commands may be received on a wireless communication media, for example.

In addition, for FIG. 6 and other processes and methods disclosed herein, each block may represent circuitry that is arranged to perform the specific logical functions in the process.

Functions of FIG. 6 may be fully performed by a control system, or may be distributed across multiple control systems. In some examples, the control system may receive information from sensors of a robotic device, or the control system may receive the information from a processor that collects the information. The control system could further communicate with a remote control system (e.g., a control system on another robotic device) to receive information from sensors of other devices, for example.

At block 602, the implementation may involve receiving sensor data indicating at least one deviation from a nominal operating parameter of the robotic device. For instance, control system 102 of FIG. 1 may receive sensor data from a sensor of sensing system 108, which may indicate one or more deviations from respective nominal operating parameters. Control system 102 may receive sensor data repeatedly, such as periodically or in response to an event (e.g., that data is available from the sensor). In some cases, the sensor data may indicate that one or more operating parameters are nominal. However, in other cases, the sensor data may indicate one or more deviations from respective nominal operating parameters.

In operation, various operating parameters may describe respective aspects of the operation of a robotic device. Sensors of a sensing system of a robotic device, such as sensing system 108, may produce data indicating respective values of these various operating parameters. During normal operation, the values of these operating parameters may vary within a nominal range. However, in some circumstances, an operating parameter may deviate from its nominal range, which may indicate that the state or configuration of the robotic device has changed.

Example operating parameters of a robotic device may include various pressure levels. As noted above, a sensing system of a robotic device may include various pressure sensors, which may produce data indicating pressure of various fluids. For instance, a robotic device may include an oil pressure sensor, perhaps to sense oil pressure of an internal combustion engine that drives a pump of a hydraulic drive system. In operation, oil pressure of the internal combustion engine may vary in a nominal range, such as from 25-35 pounds per square inch (PSI). Also as noted above, a robotic device may include one or more hydraulic pressure sensors, perhaps arranged to sense respective hydraulic fluid pressures at one or more pressure rails of a hydraulic drive system. In operation, hydraulic fluid pressure of the hydraulic drive system may vary in a nominal range, such as from 2900 to 3100 PSI, among other examples.

Example operating parameters may also include position and/or orientation of the robotic device. A sensing system may include one or more sensors, such as an IMU, that produce data indicating the position or orientation of the robotic device. Such sensors may be mounted on or within a frame of the robotic device, which may facilitate production of data indicating the orientation and/or position of the robotic device. Further, such sensors may be calibrated to define a nominal orientation and/or a nominal position. A nominal orientation may be for example, an orientation in which the robotic device is balanced on all legs. Other nominal orientations may be defined as well. A nominal position may be defined as a nominal height from a surface on which the robotic device is supported. The nominal height may be proportional to the position at which the sensor is mounted. For instance, a sensor may be mounted in a position in which the sensor is 1 meter from the ground when the robotic device is in the nominal orientation. Other examples are possible as well.

The robotic device may deviate from the nominal operating parameters. For instance, a robotic device may rotate (e.g., pitch or roll) from a nominal orientation. As another example, the height of the sensor may vary, perhaps during the gait. Oil pressure or hydraulic pressure may vary as well.

At block 604, the implementation may involve determining that the at least one deviation exceeds a pre-determined threshold based on the received sensor data. For instance, control system 102 of FIG. 1 may determine that the received sensor data indicates a deviation that exceeds a pre-determined threshold. A deviation that exceeds a pre-determined threshold may indicate an impending unstable configuration or position.

In some implementations, the deviation may involve a rotation of the robotic device relative to a nominal orientation. For example, the deviation may involve a magnitude of a rotation (e.g., a change in pitch, roll, or yaw of the robotic device). In such an example, control system 102 may receive rotational data from a sensor, such as an IMU. Based on the received rotational data, the control system 102 may determine that a magnitude of a rotation by the frame from a nominal orientation exceeds a pre-determined threshold rotation. In various implementations, the pre-determined threshold rotation may be configured at one of a variety of different magnitudes of rotation. In some cases, the pre-determined threshold rotation may be a rotation having a magnitude in the range of about 0.6 radians to about 0.9 radians. For instance, the control system 102 may determine that the magnitude of the rotation by the frame from the nominal orientation exceeds a pre-determined threshold rotation of 0.7 radians. A rotation in or beyond that range may indicate an impending unstable configuration.

In another example, the deviation may involve a rate of rotation of the robotic device. For example, control system 102 may receive rotational data from a sensor (e.g., an IMU). Based on such received rotational data, control system 102 may determine that the data indicates a rotation at a particular rate. The rate of rotation may involve a rate of change in pitch, roll, or yaw, or a combination of rotations in different directions. The control system may determine that the rate of rotation by the frame from the nominal orientation exceeds a pre-determined threshold rate of rotation. In some cases, the pre-determined threshold rate of rotation may be a rate of rotation in the range of about 2.5 radians per second to about 3.5 radians per second. Other threshold rates of rotation are possible as well.

In another example, the deviation may involve a translation of the robotic device relative to a nominal position. For example, the deviation may involve a downward translation of the frame. As noted above, in some cases, a sensor, such as an IMU, may be mounted on or within the frame of the robotic device, which may facilitate detecting translations of the robotic device. Control system 102 may receive positional data from such a sensor, and, based on the received positional data, detect a magnitude of a downward translation of the frame. Such detection may involve comparing a height of the robotic device (or of the sensor) relative to a support surface at one point in time with height of the robotic device at a second point in time (e.g., a current time) to determine a difference between the heights. Alternatively, such detection may involve comparing a height of the robotic device relative to a nominal height.

In some cases, the difference between the heights may indicate a downward translation of the robotic device that has a particular magnitude. After detecting the magnitude of the translation by the frame, control system 102 may determine that a magnitude of the translation by the frame exceeds a pre-determined threshold magnitude from a nominal frame height. For instance, control system 102 may determine that the magnitude of the translation (e.g., 0.3 m)

exceeds a predetermined threshold (e.g., 0.2 m) from a nominal frame height (e.g., 1 m).

In a further example, the at least one deviation may involve two or more deviations. For example, control system 102 may receive positional data and rotational data, indicating first and second deviations from respective nominal operating parameters, respectively. Control system 102 may then determine that either the first deviation or the second deviation exceed respective pre-determined thresholds. Alternatively, control system 102 may determine that both the first deviation and the second deviation exceed respective pre-determined thresholds. In some circumstances, identifying that two or more deviations exceed respective thresholds may facilitate detection of unstable configurations of the robotic device and may also reduce false positives (e.g., where the control system determines that a deviation exceeds a pre-determined threshold, but where an unstable position or configuration does not occur).

Further, in some implementations, a second pre-determined threshold may change based on determining that a first deviation exceeds a first pre-determined threshold. For instance, control system 102 may receive positional data and rotational data, indicating first and second deviations from respective nominal operating parameters, respectively. Based on the positional data, control system 102 may detect a magnitude of a downward translation by a frame of the robotic device. Then, control system 102 may determine that the magnitude exceeds a pre-determined threshold magnitude. In response, control system 102 may adjust the second pre-determined threshold to a different pre-determined threshold. For instance, control system 102 may reduce the threshold from a rotation within a range of about 0.6 radians to about 0.9 radians to a threshold within a rotation within a range of about 0.1 radians to about 0.3 radians. The control system may then determine that a magnitude of rotation by the frame from a nominal orientation exceeds the adjusted threshold. Adjusting a second pre-determined threshold after determining that a deviation has exceeded a first pre-determined threshold may facilitate detecting an impending unstable position or configuration, among other possible benefits.

As noted above, in some implementations, a hydraulic drive system may provide pressurized hydraulic fluid to respective hydraulic actuators. For instance, control system 102 may cause hydraulic drive system 104 to provide pressurized hydraulic fluid at a nominal pressure to respective hydraulic actuators of locomotion system 106. In such cases, the at least one deviation may involve a deviation from the nominal pressure. For instance, control system 102 may receive sensor data from a pressure sensor coupled to hydraulic drive system 104. Based on such received sensor data, control system 102 may determine that the nominal pressure has decreased below a pre-determined threshold pressure. As an example, the pre-determined threshold pressure may be configured as a pressure that is about 40% to 60% of the nominal pressure. Other pre-determined threshold pressures are possible as well. After the hydraulic fluid pressure has decreased below the pre-determined threshold pressure, the hydraulic actuators of the legs might not be able to support the robotic device, which may cause the robotic device to enter an unstable configuration or position.

Based on determining that the at least one deviation exceeds the pre-determined threshold, the robotic device may perform one or more of a variety of operations. Such operations may be responsive to determining that the at least one deviation exceeds the pre-determined threshold. Performing these operations may reduce or prevent damage to the robotic device during an unstable position or configuration (e.g., a crash).

At block 606, the implementation may involve centering one or more strokes of respective actuators at approximately a mid-point of extension. Centering involves causing the respective linear hydraulic actuators to extend or retract about the mid-point between full extension and full retraction. For example, control system 102 may center one or more strokes of respective linear hydraulic actuators of locomotion system 106 at approximately a mid-point of extension of those respective linear hydraulic actuators. Such centering may cause the robotic device to "squat", which may lower the robotic device's center of gravity. The centering may also mitigate the risk that an actuator piston will collide with an end of an actuator assembly. Such a collision may cause a large impulse force that may result in damage to the robotic device.

As noted above, some linear hydraulic actuators may be capable of actuating along a stroke length from full retraction to full extension. A given stroke may involve the entire stroke length, or a portion of the stroke length. Initially, a gait may involve a series of strokes of respective linear hydraulic actuators, perhaps with one or more strokes centered at respective points along the stroke length other than a mid-point of extension. The gait may then be adjusted such that the one or more strokes are centered at the mid-point of extension.

Figure 7:
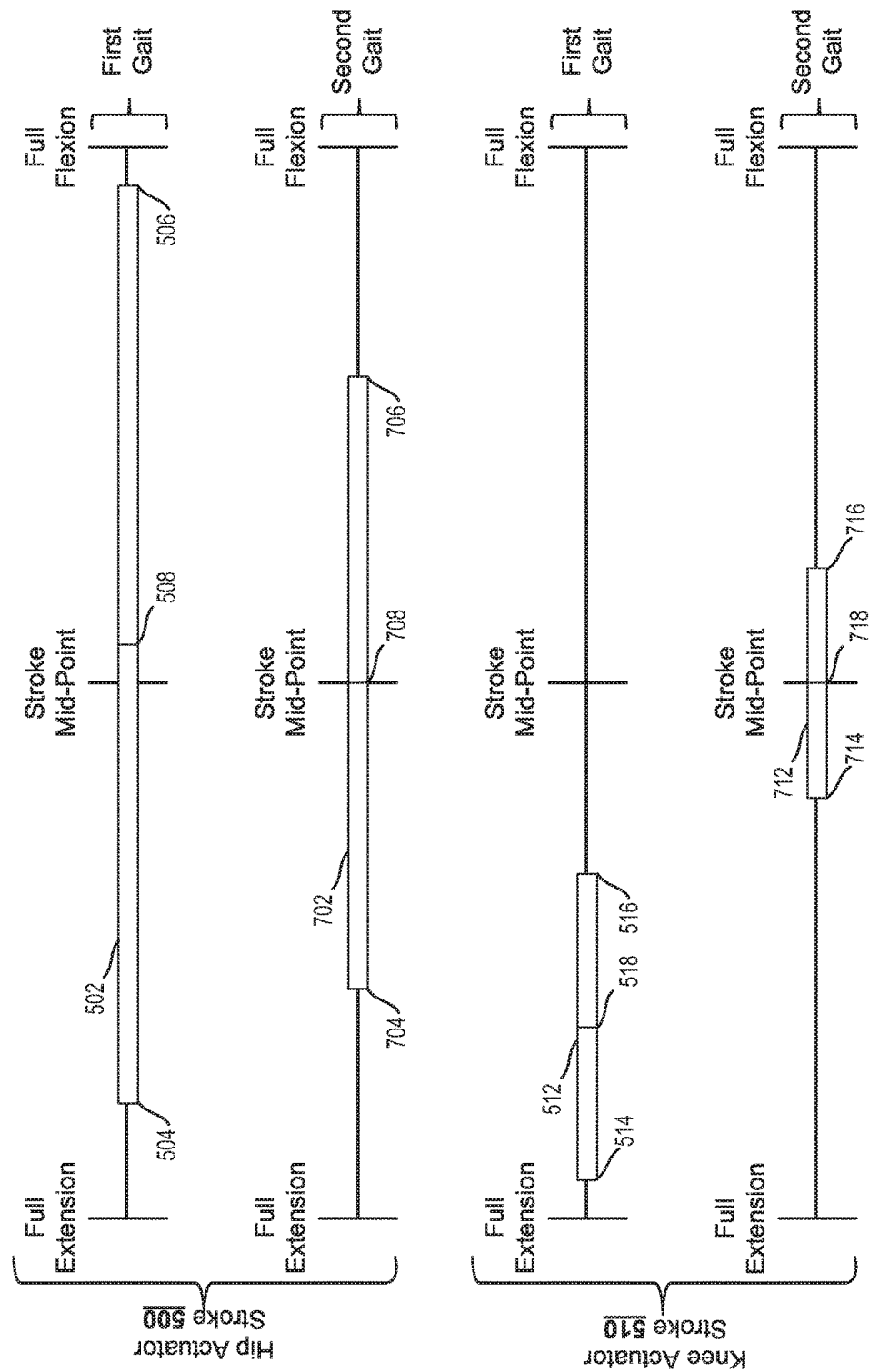
FIG. 7 shows respective example strokes of example hip actuators and example knee actuators in two example gaits.

FIG. 7 shows the example hip actuator stroke 500 and the example knee actuator stroke 510 of FIG. 5. As shown in FIGS. 4A-4B, an example gait (a first gait) may involve one or more first strokes of respective hip actuators and/or one or more second strokes of respective knee actuators. As an example, the respective hip actuators may actuate in stroke range 502 centered at point 508. The respective knee actuators may actuate in a range 512 centered at point 518. As noted above, a robotic device may center one or more first strokes and/or the one or more second strokes.

After centering, linear hydraulic actuators of the robotic device may actuate in respective stroke ranges centered at approximately the respective mid-points between full extension and full retraction of the linear hydraulic actuators. For example, the respective hip actuators may actuate within stroke range 702 centered at point 708, which is at the mid-point of extension of hip actuator stroke 500. Stroke range 702 extends from point 704 to point 706. The respective knee actuators may actuate within a range 712 centered at point 718, which is at the mid-point of extension of hip actuator stroke 510. Stroke range 712 extends from point 714 to point 716.

At block 608 in FIG. 6, the implementation may involve reducing a stroke length of the one or more strokes of the actuators. For example, control system 102 may reduce the stroke length of one or more strokes of respective linear hydraulic actuators of locomotion system 106. Such a reduction of stroke length may result in shorter steps, which may increase stability of the robotic device. In various implementations, the stroke length may be reduced by different amounts. For instance, the stroke length may be reduced by about 30-60%.

Referring back to FIG. 7, in an example gait, respective hip actuators and respective knee actuators may actuate within stroke range 502 and stroke range 512, respectively. The robotic device may reduce the stroke length of the respective hip actuators and/or the respective knee actuators in response to determining that at least one deviation exceeds the determined threshold (e.g., that a magnitude of a transformation exceeds a pre-determined threshold). After the stroke lengths are reduced, the respective hip actuators and respective knee actuators may actuate within stroke range 702 and stroke range 712, respectively, which are shorter than stroke range 502 and range 512.

FIGS. 8A-8D illustrate the robotic device 400 at various example positions during an example gait in which strokes of the hydraulic actuators have been centered at a mid-point of extension and reduced in length from the example gait shown in FIGS. 4A-4D.

Figure 8A:
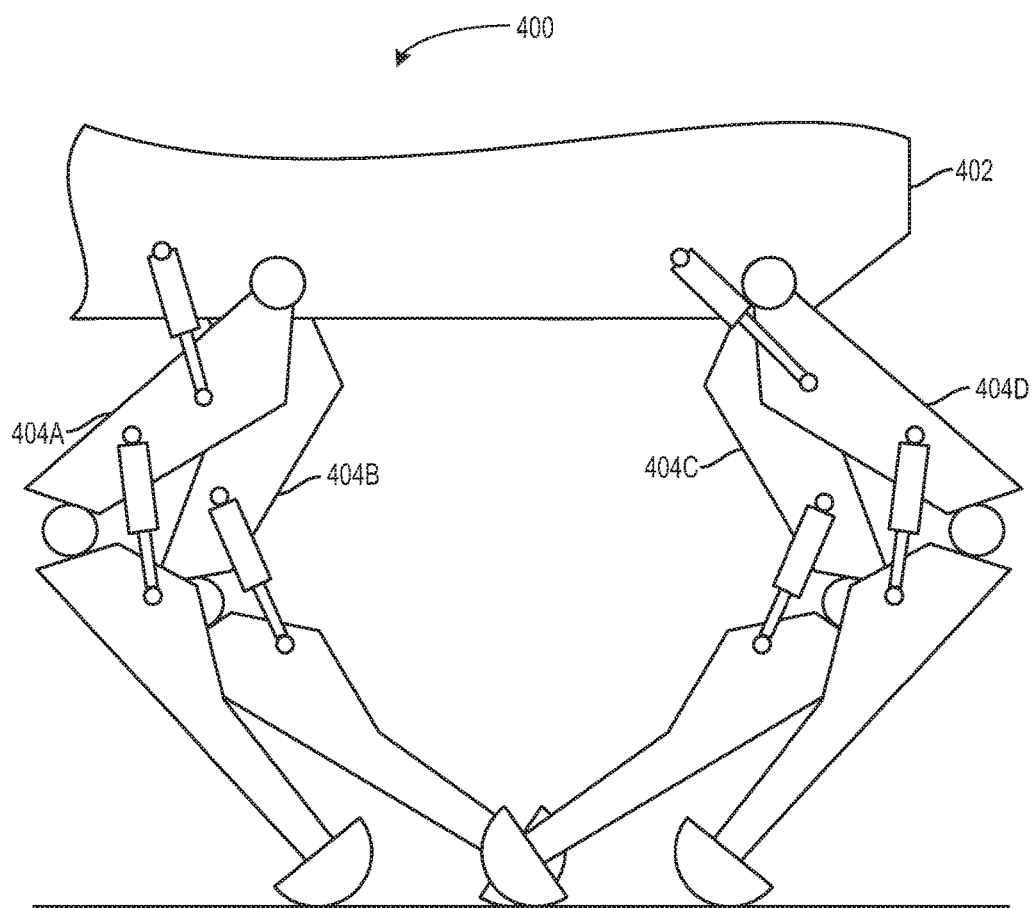
FIGS. 8A, 8B, 8C, and 8D illustrate the example robotic device moving according to another example gait.

FIG. 8A may represent a first position of the example gait in which the robotic device is balanced on legs 404A, 404B, 404C, and 404D. The respective hip actuators are at approximately the respective mid-points of their stroke between full extension and full retraction. In this implementation, such a position causes the respective hip joints to be approximately at mid-points between full flexion and full extension. The respective knee actuators are near full extension, which causes the respective knee joints to be near full extension. Such positioning may cause the robotic device to "squat," as shown in FIG. 8A.

Figure 8B:
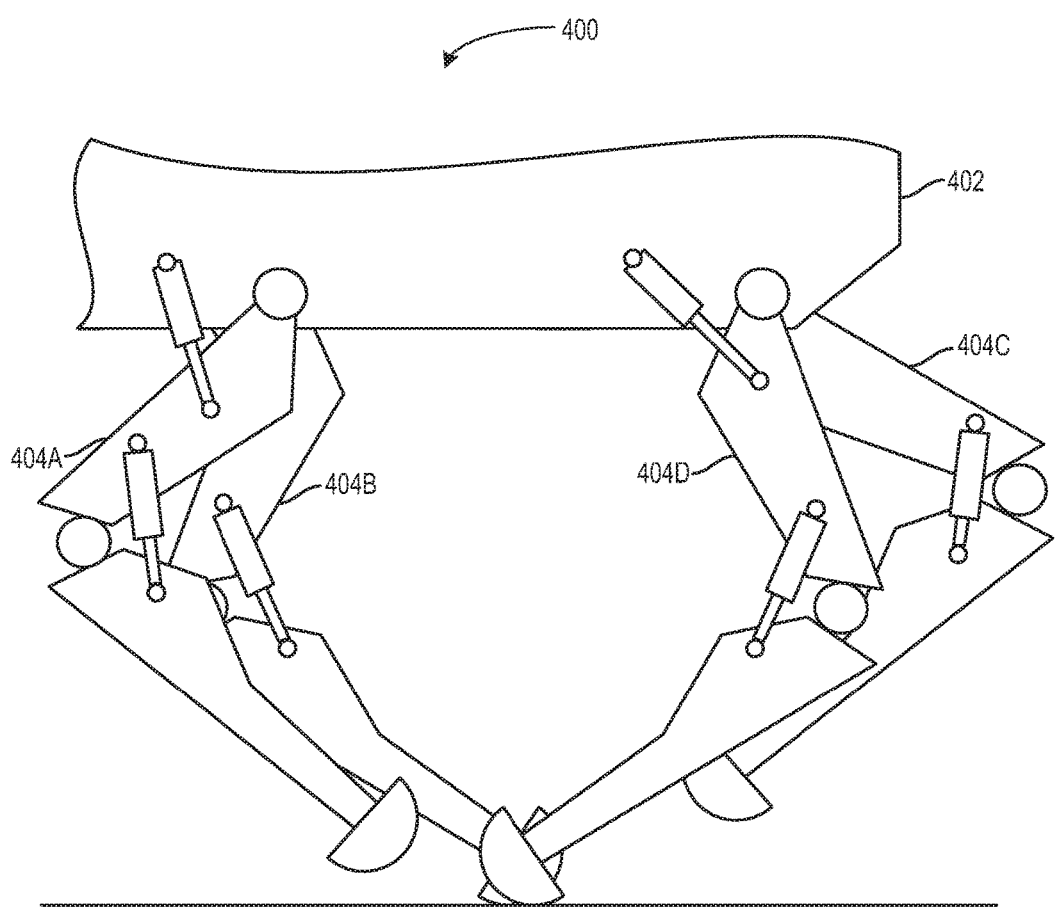

In FIG. 8B, legs 404A and 404D may step forward. To step forward, the respective hip joints of legs 404A and 404D may undergo flexion caused by retraction of the respective hip actuators. As the stroke length has been reduced compared to the gait shown in FIGS. 4A-4D, the respective hip actuators may retract by a lesser amount than as shown in FIG. 4B. In addition, the respective knee joints of legs 404A and 404D may undergo flexion caused by some retraction of the respective knee actuators. As with the respective hip actuators, the respective knee actuators may retract by a lesser degree than as shown in FIG. 4B. Such flexion may cause the respective hip actuators and the respective knee actuators to remain nearer to their respective mid-points of their strokes compared to the example gait shown in FIG. 4B.

Figure 8C:
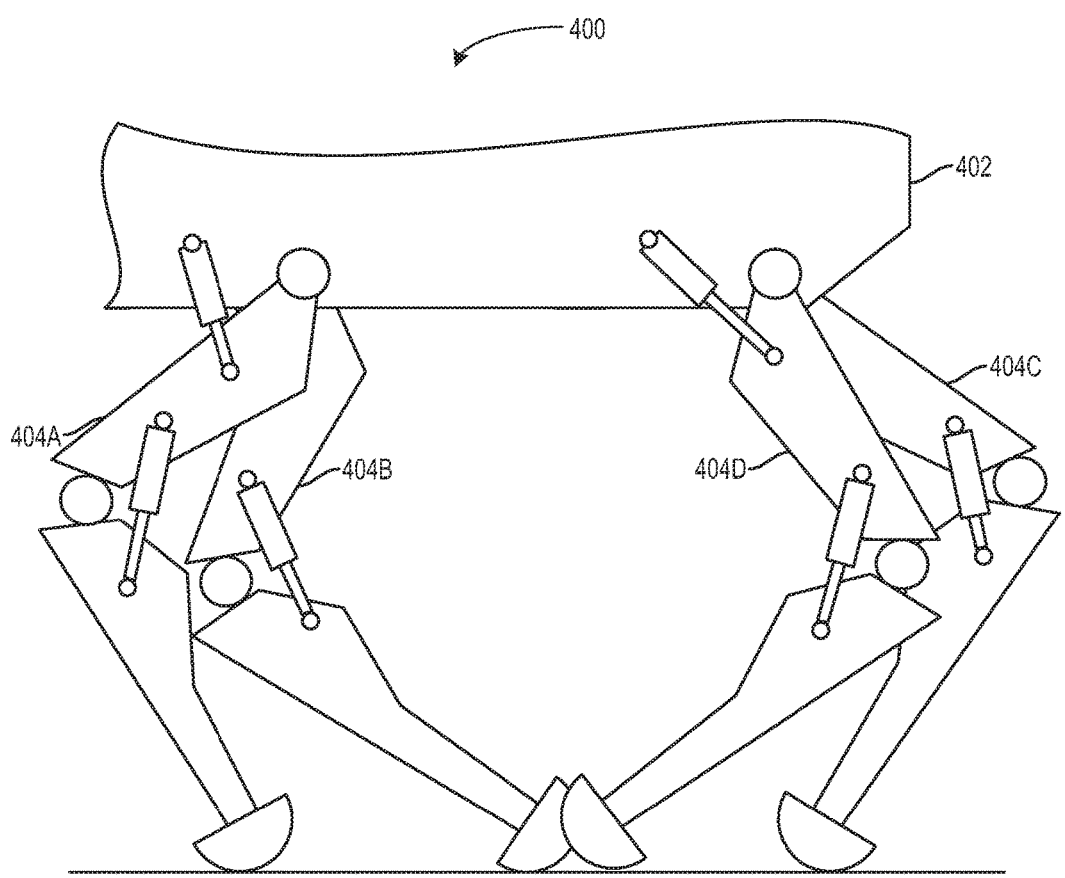

In FIG. 8C, legs 404A and 404D may lower to make contact with the support surface. Relative to FIG. 8B, the respective hip joints of legs 404A and 404D undergo extension caused by extension of the respective hip actuators. The respective knee joints of legs 404A and 404D may undergo some extension caused by some extension of the respective knee actuators. During such extensions, the respective hip actuators and the respective knee actuators may remain nearer to their respective mid-points of their strokes compared to the example gait shown in FIG. 4C.

Figure 8D:
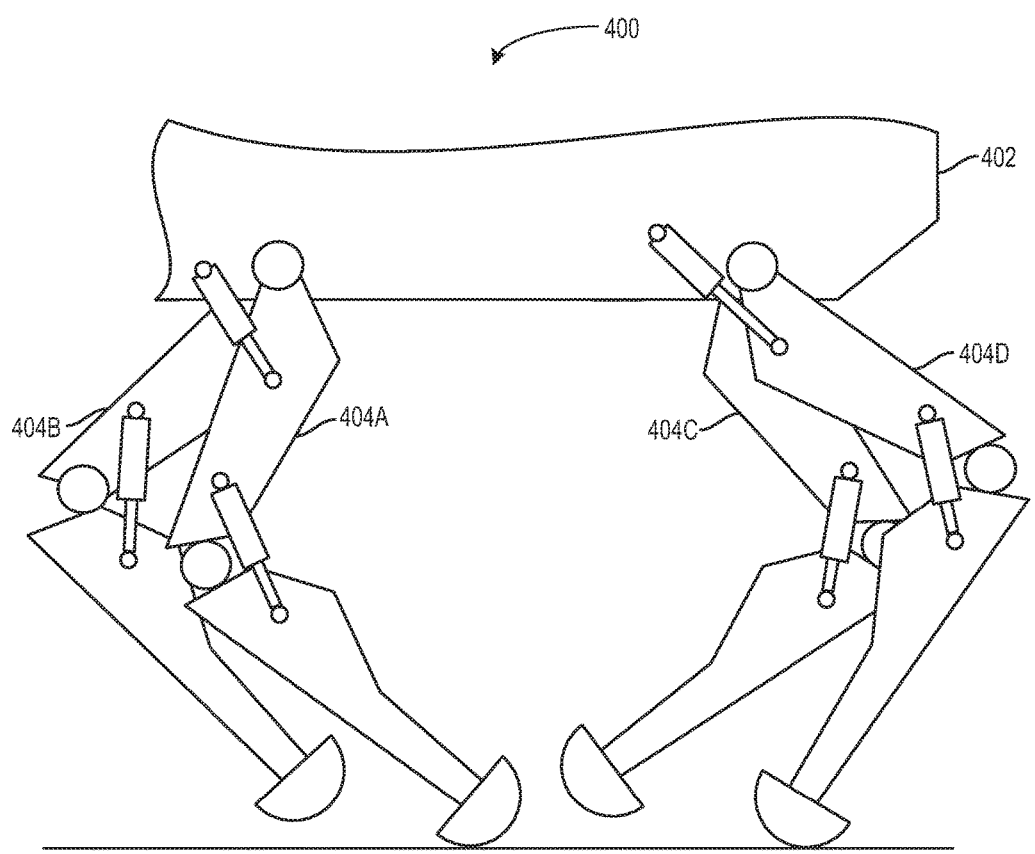

In FIG. 8D, legs 404A, 404B, 404C, and 404D have undergone movement. Legs 404A and 404D may swing backward to move the frame forward relative to the support surface. To swing backward, the respective hip joints of legs 404A and 404D undergo further extension caused by extension of the respective hip actuators. The respective hip actuators may extend by a lesser amount than as shown in FIG. 4D, which may cause the respective hip joints to remain relatively closer to their respective mid-points between full extension and full retraction. The respective knee joints of legs 404A and 404D may undergo some extension caused by extension of the respective knee actuators, while also remaining relatively closer to their respective mid-point between full extension and full retraction. Legs 404B and 404C may step forward. To step forward, the respective hip joints of legs 404B and 404C may undergo flexion caused by retraction of the respective hip actuators. In addition, the respective knee joints of legs 404B and 404C may undergo flexion caused by some retraction of the respective knee actuators.

Another operation that the robotic device may perform in response to determining that the at least one deviation exceeds the pre-determined threshold is increasing a stroke rate of the respective hydraulic actuators. For instance, control system 102 of FIG. 1 may cause respective hydraulic actuators to actuate at an increased stroke rate. An increased stroke rate may cause the robotic device to move with quicker steps, which may improve stability of the robotic device and/or reduce or prevent an unstable configuration, among other possible effects.

In some implementations, the robotic device may reduce speed of the frame relative to the ground on which the robotic device is traversing, perhaps also in response to determining that the at least one deviation exceeds the pre-determined threshold or another condition. For instance, control system 102 of FIG. 1 may cause respective hydraulic actuators to actuate at slower speeds. Slower actuations may reduce the speed of the frame relative to the ground. Reducing the speed of the frame relative to the ground may lessen any forces sustained by the robotic device while entering an unstable configuration, such as in a crash.

After adjusting or changing the gait (e.g., centering strokes of the respective hydraulic actuators or reducing their stroke length), the implementation may involve holding the respective hydraulic actuators at approximately the mid-point of extension. For example, control system 102 may cause the respective hydraulic actuators to hold approximately the mid-point of extension. For instance, for a given hydraulic actuator, the control system 102 may cause the hydraulic drive system 104 to supply pressurized hydraulic fluid at approximately the same pressure to respective chambers in the hydraulic actuators. Causing the respective hydraulic actuators to hold at a point may result in the hydraulic actuators operating as dampeners to forces experience by the members to which the hydraulic actuators are coupled.

For example, the control system may receive force data from a sensor, and, based on the received force data from the sensor, detect an impact force on a given articulable leg. In response to detecting the impact force on the given articulable leg, the control system may adjust the centering of the one or more strokes by a component that is approximately proportional to the impact force. Such a component may reduce the impact force on the articulable leg. For instance, the impact force on the given articulable leg may exert, as a component of the impact force, a bending force on a given actuator. To reduce this bending force, the control system may adjust the centering of the one or more strokes by a component that is approximately proportional to the bending force, which may cause the actuator to be compliant with the bending force. In this manner, the force on the given articulable leg (and perhaps the actuator) may be reduced. In some cases, the component may move the actuators away from the mid-point of extension (i.e., operate against the centering of the actuators). However, such a component may facilitate avoiding end stops of the actuators.

Figure 9:
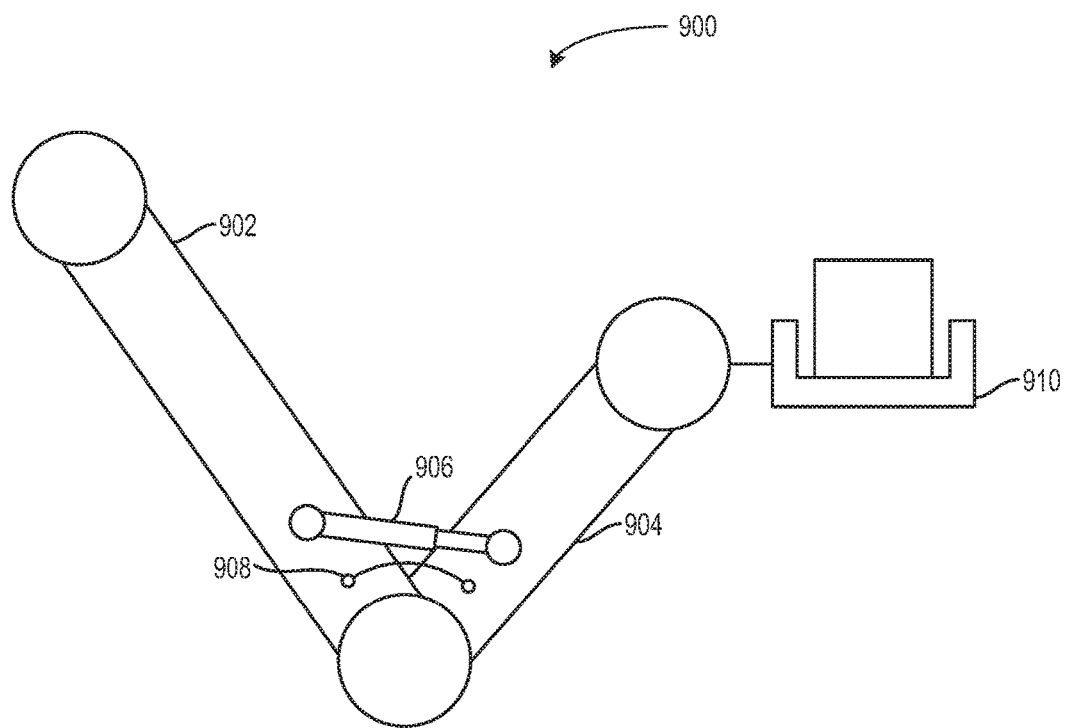
FIG. 9 is a side-view of an example robotic arm.

In some cases, the robotic device may include a robotic manipulator, such as a robotic arm. FIG. 9 is a side-view of an example articulable robotic arm 900 that includes a member 902 coupled to a member 904. A linear hydraulic actuator 906 may cause the member 904 to rotate relative to the member 904. The robotic arm 900 also includes a force sensor 908 that generates data indicating the load on the linear hydraulic actuator 906. The robotic arm 900 also includes an end effector 910 that may pick up an object.

In some cases, the implementation may involve causing one or more hydraulic actuators of one or more articulable arms (e.g., articulable arm 900) to hold at approximately a mid-point of extension. For instance, a control system may cause one or more linear hydraulic actuators to hold at approximately a mid-point of extension based on determining that a deviation in sensor data exceeds a pre-determined threshold. Such an operation may draw the articulable arms closer to the frame of the robotic device, which may reduce the risk of damage during an unstable configuration. Further, causing the one or more linear hydraulic actuators to hold may result in the hydraulic actuators operating as dampeners to forces experience by the members to which the hydraulic actuators are coupled (e.g., member 902 and 904).

Figure 10:
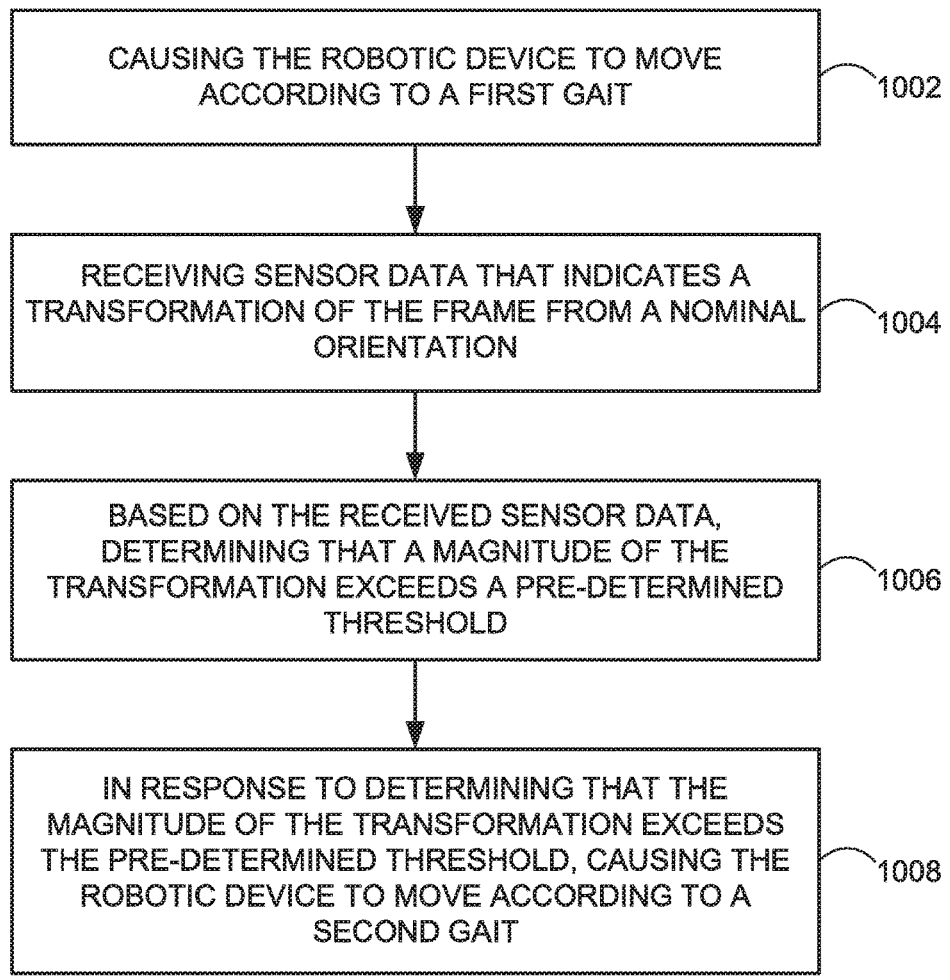
FIG. 10 is a flow chart illustrating an example method to transition from a first gait to a second gait based on detection of an impending unstable configuration of a robotic device.

FIG. 10 is a flowchart illustrating example operations taken based on detecting an unstable configuration of a robotic device. These operations, for example, could be used with the robotic device 100 in FIG. 1, the robotic device 200 in FIG. 2, the robotic legs 300 in FIGS. 3A and 3B, for example, or may be performed by a combination of any components of the robotic device 100 in FIG. 1, the robotic device 200 in FIG. 2, and/or the robotic legs 300 in FIGS. 3A and 3B. FIG. 10 may include one or more operations, functions, or actions as illustrated by one or more of blocks 1002-1010. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for FIG. 10 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include a non-transitory computer-readable medium, for example, such as computer-readable media that stores data for short periods of time like register memory, processor cache and random access memory (RAM). The computer-readable medium may also include other non-transitory media, such as secondary or persistent long term storage, like read only memory (ROM), optical or magnetic disks, compact-disc read only memory (CD-ROM), for example. The computer-readable media may also be any other volatile or non-volatile storage system. The computer-readable medium may be considered a computer-readable storage medium, a tangible storage device, or other article of manufacture, for example. The program code (or data for the code) may also be stored or provided on other media including communication media. For instance, the commands may be received on a wireless communication media, for example.

In addition, for FIG. 10 and other processes and methods disclosed herein, each block may represent circuitry that is arranged to perform the specific logical functions in the process.

Functions of FIG. 10 may be fully performed by a control system, or may be distributed across multiple control systems. In some examples, the control system may receive information from sensors of a robotic device, or the control system may receive the information from a processor that collects the information. The control system could further communicate with a remote control system (e.g., a control system on another robotic device) to receive information from sensors of other devices, for example.

At block 1002, the robotic device may move according to a first gait. For instance, control system 102 may cause robotic device 100 to move according to a first gait. Moving according to the first gait may involve actuating the respective hip joints in a first range from approximately full extension of the hip joints to approximately full flexion of the hip joints and actuating the respective knee joints in a second range centered near full extension of the knee joints, as illustrated in FIGS. 4A-4D and FIG. 7.

At block 1004, the robotic device may receive sensor data that indicates a transformation of the frame from a nominal orientation. For instance, control system 102 may receive sensor data that indicates a translation (e.g., a downward translation from a nominal height) or a rotation (e.g., a rotation from a nominal orientation). Alternatively, the sensor data may indicate a rate of translation or a rate of rotation. Other transformations are possible as well, such as a combination of a rotation and a translation.

At block 1006, the robotic device may determine that a magnitude of the transformation exceeds a pre-determined threshold. For instance, based on the received sensor data, control system 102 may determine that a magnitude of the transformation exceeds a pre-determined threshold. Such a threshold may be a magnitude of a rotation, a magnitude of a translation, a rate of rotation, or a rate of translation, among other examples.

At block 1008, the robotic device may move according to a second gait. For example, in response to determining that the magnitude of the transformation exceeds the pre-determined threshold, controls system 102 may cause robotic device 100 to move according to a second gait. The second gait may involve actuating the respective hip joints in a third range from partial extension of the hip joints to partial flexion of the hip joints, and actuating the respective knee joints in a fourth range centered at approximately a mid-point between full extension of the respective knee joints and full flexion of the respective knee joints, as illustrated in FIGS. 8A-8D and FIG. 7. In some cases, the third range may be centered at approximately a mid-point between full extension of the hip joints and full flexion of the hip joints.

The second gait may differ from the first gait in various additional ways. For example, in some cases, the cycle of the second gait may be shorter than the first gait, which may cause the robotic device to take quicker, shorter steps. These steps may reduce the speed of the robotic device relative to the support surface. In some examples, the second gait may involve increasing a stance width between the at least one left leg and the at least one right leg. This may result in relatively greater stability. Further, if a crash does occur, such a widened stance may facilitate the robotic device landing in a particular orientation, such as on a bottom side of its frame. The stance may be widened by various degrees, such as by 5% to 25%.

In some implementations, after moving according to the second gait for a pre-determined period of time, the respective hip joints may hold at approximately the mid-point between full extension of the hip joints and full flexion of the hip joints and the respective knee joints may hold at approximately the mid-point between full extension of the knee joints and full flexion of the knee joints.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A method comprising:
    receiving, by a control system of a robotic device, sensor data indicating at least one deviation from a nominal operating parameter of the robotic device, wherein the robotic device comprises articulable legs that include respective actuators, and wherein one or more strokes of the respective actuators cause the articulable legs to articulate, wherein each stroke of the one or more strokes comprises motion of a given actuator of the respective actuators along a corresponding first portion of a corresponding range of actuation of the given actuator, the corresponding range of actuation extending from full extension of the given actuator to full retraction of the given actuator;
    based on the received sensor data, determining that the at least one deviation exceeds a pre-determined threshold;
    in response to determining that the at least one deviation exceeds the pre-determined threshold, the control system providing instructions for performing predetermined functions;
    based on force data from a force sensor, detecting an impact force on a given articulable leg; and
    in response to detecting the impact force on the given articulable leg, adjusting the provided instructions to offset the stroke of the respective actuator of the given articulable leg from approximately a mid-point of the corresponding range of actuation of the respective actuator by a component that is approximately proportional to the impact force.

2. The method of claim 1, wherein the instructions for performing the predetermined functions comprise instructions for centering strokes of the respective actuators at approximately mid-points of the corresponding ranges of actuation of the respective actuators.

3. The method of claim 1, wherein the instructions for performing the predetermined functions comprise instructions for reducing stroke lengths of the respective actuators from the corresponding first portions of the corresponding ranges of actuation to corresponding second portions of the corresponding ranges of actuation that are shorter than the corresponding first portions, wherein the reduced stroke lengths are approximately centered on the mid-points of the corresponding ranges of actuation of the respective actuators.

4. The method of claim 1, wherein the robotic device further comprises a frame coupled to the articulable legs, and the instructions for performing the predetermined functions comprise instructions for reducing speed of the frame relative to a support surface on which the robotic device traverses.

5. The method of claim 1, wherein the robotic device further comprises a frame coupled to the articulable legs, and the instructions for performing the predetermined functions comprise instructions for increasing stroke rates of the respective actuators.

6. The method of claim 1, wherein the robotic device further comprises a frame coupled to the articulable legs, and an inertial measurement unit, and the instructions for performing the predetermined functions comprise instructions for, based on rotational data from the inertial measurement unit, determining that a magnitude of a rotation by the frame from a nominal orientation exceeds a pre-determined threshold rotation.

7. The method of claim 6, wherein the pre-determined threshold rotation is within a range of about 0.6 radians to about 0.9 radians.

8. The method of claim 1, wherein the robotic device further comprises a frame coupled to the articulable legs, and an inertial measurement unit, and the instructions for performing the predetermined functions comprise instructions for, based on rotational data from the inertial measurement unit, determining that a rate of rotation by the frame from a nominal orientation exceeds a pre-determined threshold rate of rotation.

9. The method of claim 8, wherein the pre-determined threshold rate of rotation is within a range of about 2.5 radians per second to about 3.5 radians per second.

10. The method of claim 1, wherein the robotic device further comprises a frame coupled to the articulable legs, and a position sensor coupled to the frame, and the instructions for performing the predetermined functions comprise instructions for:
    based on positional data from the position sensor, detecting a magnitude of a downward translation by the frame; and
    after detecting the magnitude of the downward translation by the frame, determining that the magnitude of the downward translation by the frame exceeds a pre-determined threshold magnitude from a nominal frame height.

11. The method of claim 10, wherein determining that the at least one deviation exceeds the pre-determined threshold further comprises:
    based on rotational data from the sensor, detecting a magnitude of rotation by the frame; and
    determining that the magnitude of rotation by the frame from a nominal orientation exceeds a pre-determined threshold rotation, wherein the pre-determined threshold rotation is within a range of about 0.1 radians to about 0.3 radians.

12. The method of claim 1, wherein the respective actuators comprise respective hydraulic actuators, the method further comprising:
    causing a hydraulic drive system to provide pressurized hydraulic fluid at a nominal pressure to the respective hydraulic actuators,
    wherein the instructions for performing the predetermined functions comprise instructions for, based on pressure data from a pressure sensor coupled to the hydraulic drive system, determining that the nominal pressure has decreased below a pre-determined threshold pressure, wherein the pre-determined threshold pressure is within a range of about 40% to about 60% of the nominal pressure.

13. A robotic device comprising:
a frame;
articulable legs comprising:
respective first members rotatably coupled to the frame;
respective first hydraulic actuators coupled between the frame and the first members;
respective second members rotatably coupled to the first members, each of the respective second members having a ground striking end; and
respective second hydraulic actuators coupled between the first members and the second members;
one or more sensors; and
a control system comprising a processor and a data storage containing instructions that, when executed by the processor, cause the processor to perform operations comprising:
causing the first hydraulic actuators and the second hydraulic actuators to move the articulable legs according to a gait, wherein the gait involves one or more first strokes of the first hydraulic actuators and one or more second strokes of the second hydraulic actuators, wherein each stroke of the one or more first strokes and each stroke of the one or more second strokes comprises motion of a respective actuator of the first hydraulic actuators or the second hydraulic actuators along a corresponding first portion of a corresponding range of actuation of the respective actuator, the corresponding range of actuation extending from full extension of the respective actuator to full retraction of the respective actuator;
receiving data from the one or more sensors that indicates a transformation of the frame from a nominal orientation;
based on the data received from the one or more sensors, determining that a magnitude of the transformation exceeds a pre-determined threshold; and
based on determining that the magnitude of the transformation exceeds the pre-determined threshold, performing a predetermined function.

14. The robotic device of claim 13, wherein the predetermined function comprises:
reducing stroke lengths of the first hydraulic actuators from the corresponding first portions of the corresponding ranges of actuation to corresponding second portions of the corresponding ranges of actuation that are shorter than the corresponding first portions; and
centering strokes of the second hydraulic actuators at approximately mid-points of the corresponding ranges of actuation of the second hydraulic actuators.

15. The robotic device of claim 14, wherein reducing the stroke lengths of the first hydraulic actuators comprises reducing the corresponding first portions of the corresponding ranges of actuation by about 30-60% to form the corresponding second portions of the corresponding ranges of actuation.

16. The robotic device of claim 13, wherein the predetermined function comprises:
centering strokes of the first hydraulic actuators at approximately mid-points of the corresponding ranges of actuation of the first hydraulic actuators, and
reducing stroke lengths of the second hydraulic actuators from the corresponding first portions of the corresponding ranges of actuation to corresponding second portions of the corresponding ranges of actuation that are shorter than the corresponding first portions.

17. The robotic device of claim 13, wherein the operations further comprise after a pre-determined duration of time from determining that the magnitude of the transformation exceeds the pre-determined threshold, causing the second hydraulic actuators to hold at approximately a mid-point of extension.

18. The robotic device of claim 13, further comprising one or more articulable arms, wherein the one or more articulable arms comprise respective third hydraulic actuators, and wherein the operations further comprise, based on determining that the magnitude of the transformation exceeds the pre-determined threshold, causing the respective third hydraulic actuators to hold at approximately mid-points between full extension and full retraction of the respective third hydraulic actuators.

19. A method comprising:
causing, by a control system, a robotic device to move according to a first gait, wherein the robotic device comprises two or more legs coupled to a frame, wherein the two or more legs include respective hip joints, respective knee joints, at least one left leg, and at least one right leg, and wherein moving according to the first gait comprises:
actuating the respective hip joints in a first range of motion; and
actuating the respective knee joints in a second range of motion;
receiving sensor data that indicates a transformation of the frame from a nominal orientation;
based on the received sensor data, determining that a magnitude of the transformation exceeds a pre-determined threshold; and
in response to determining that the magnitude of the transformation exceeds the pre-determined threshold, causing the robotic device to move according to a second gait, wherein moving according to the second gait comprises:
increasing a stance width between the at least one left leg and the at least one right leg, wherein the stance width comprises a distance separating the at least one left leg and the at least one right;
actuating the respective hip joints in a third range of motion smaller than the first range of motion; and
actuating the respective knee joints in a fourth range of motion centered more toward a mid-point between full extension of the respective knee joints and full flexion of the respective knee joints than the second range of motion.

20. The method of claim 19, wherein the first range of motion is from approximately full extension of the hip joints to approximately full flexion of the hip joints, and the second range of motion is centered at about full extension of the knee joints.

21. The method of claim 19, wherein the third range of motion is from partial extension of the hip joints to partial flexion of the hip joints, and the fourth range of motion is centered at approximately the mid-point between full extension of the respective knee joints and full flexion of the respective knee joints.

22. The method of claim 19, wherein the third range of motion is centered at approximately a mid-point between full extension of the hip joints and full flexion of the hip joints.

23. The method of claim 19, further comprising, after moving according to the second gait for a pre-determined period of time, causing the respective hip joints to hold at approximately a mid-point between full extension of the hip joints and full flexion of the hip joints and causing the respective knee joints to hold at approximately the mid-point between full extension of the knee joints and full flexion of the knee joints.

* * * * *